United States Patent [19]

Lewis et al.

[11] Patent Number: 5,303,042
[45] Date of Patent: Apr. 12, 1994

[54] COMPUTER-IMPLEMENTED METHOD AND APPARATUS FOR REMOTE EDUCATIONAL INSTRUCTION

[75] Inventors: Howard S. Lewis, San Jose; Steve R. Falcon, Palo Alto; Jimmy Soetarman, San Jose; John A. Roberts, III, Santa Clara; Yean W. Chan; Richard M. Hartman, both of Sunnyvale, all of Calif.

[73] Assignee: One Touch Systems, Inc., Santa Clara, Calif.

[21] Appl. No.: 858,321

[22] Filed: Mar. 25, 1992

[51] Int. Cl.$^5$ ............................................. H04N 7/15
[52] U.S. Cl. ...................................... 348/14; 434/307
[58] Field of Search ................ 364/419; 434/307, 308, 434/322, 323, 350, 352; 358/84, 85, 86; 455/2, 3.1, 5.1; 379/53

[56] References Cited

U.S. PATENT DOCUMENTS

| | | |
|---|---|---|
| 3,606,688 | 9/1971 | Zawels et al. |
| 4,360,827 | 11/1982 | Braun .............................. 358/85 |
| 4,367,485 | 1/1983 | Hemmie ........................... 358/86 |
| 4,682,957 | 7/1987 | Young .............................. 434/307 |
| 4,768,087 | 8/1988 | Taub et al. ....................... 434/307 |
| 4,785,472 | 11/1988 | Shapiro ............................ 434/307 |

Primary Examiner—Roy N. Envall, Jr.
Assistant Examiner—Jennifer L. Hazard
Attorney, Agent, or Firm—Thomas E. Schatzel

[57] ABSTRACT

An apparatus of the present invention includes a viewer response system comprising a host site and at least one remote site interconnected by a satellite channel for host-to-remote video, an X.25 communications channel for message exchanges establishing a virtual circuit between each remote and the host site, and a dial-up public phone network channel that allows the host site to dial a remote site in response to a person at the remote site wanting to speak on the system to another person at the host site. A touch screen monitor at the host site allows the other person to sequence through electronic notecards that function as presentation cue cards. Questions can be formatted on remote site monitors and keypad terminals for each person at each remote site to allow real-time responses to be entered. A computer supporting the host site computes and displays remote site status and person's responses.

16 Claims, 13 Drawing Sheets

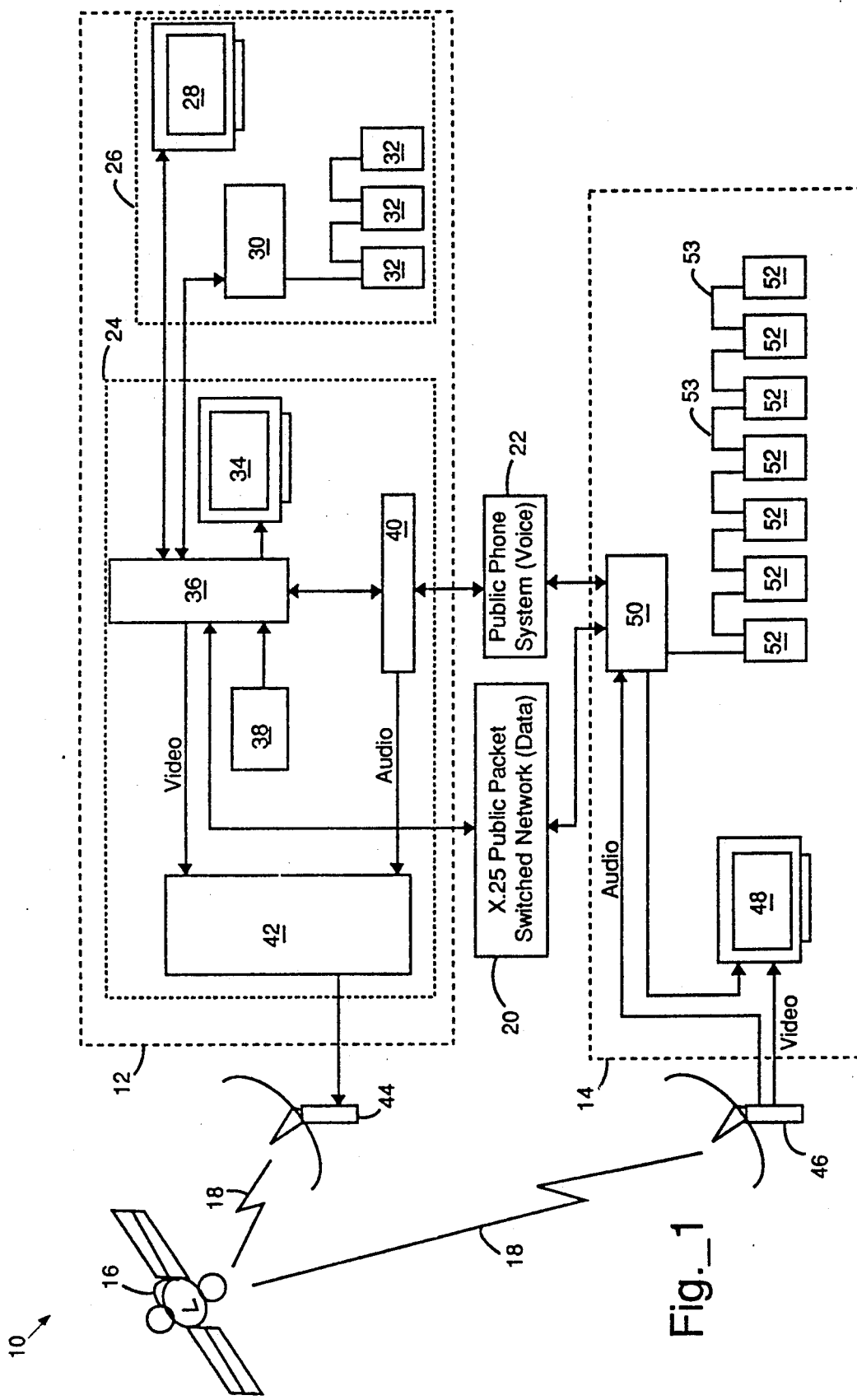
Fig._1

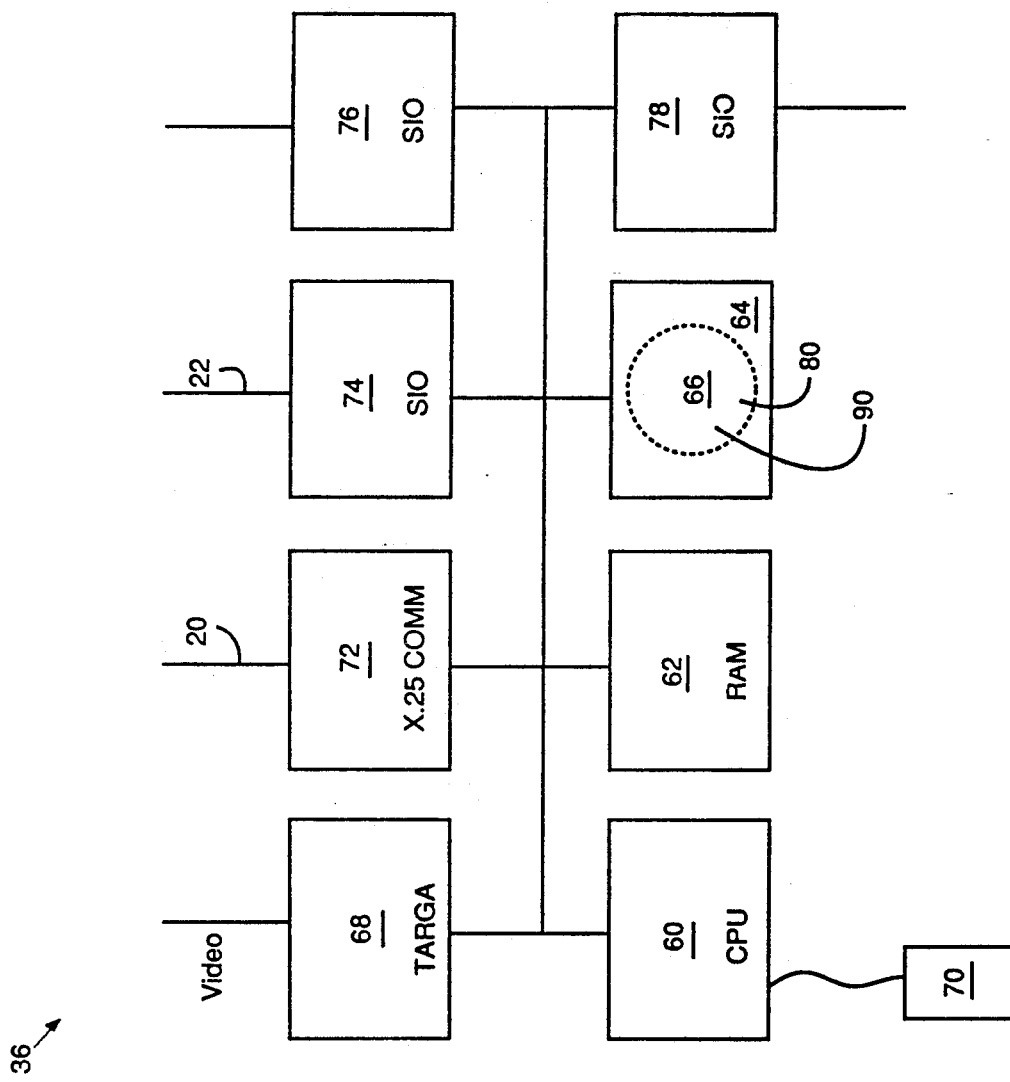
Fig._2

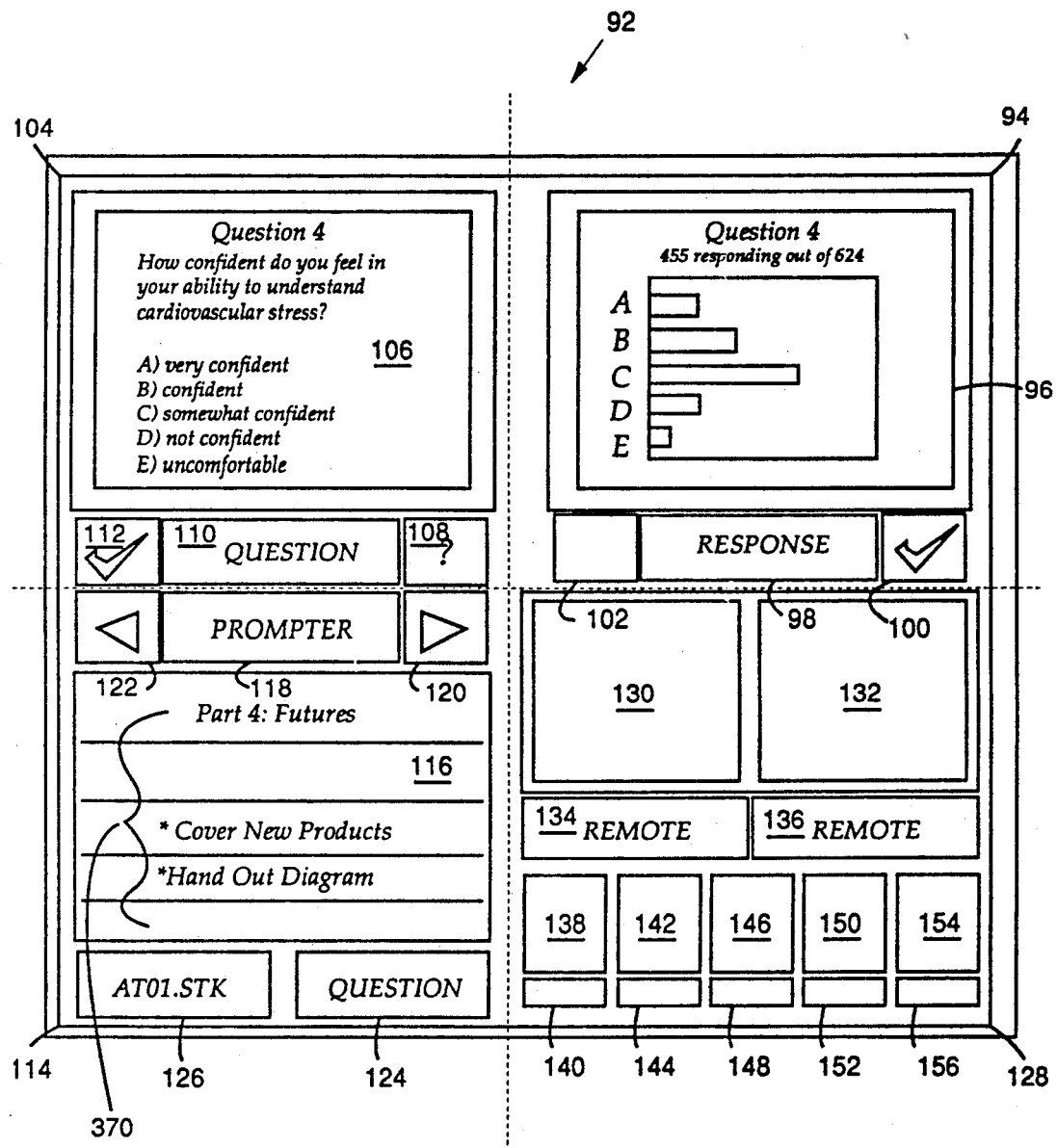
Fig._3

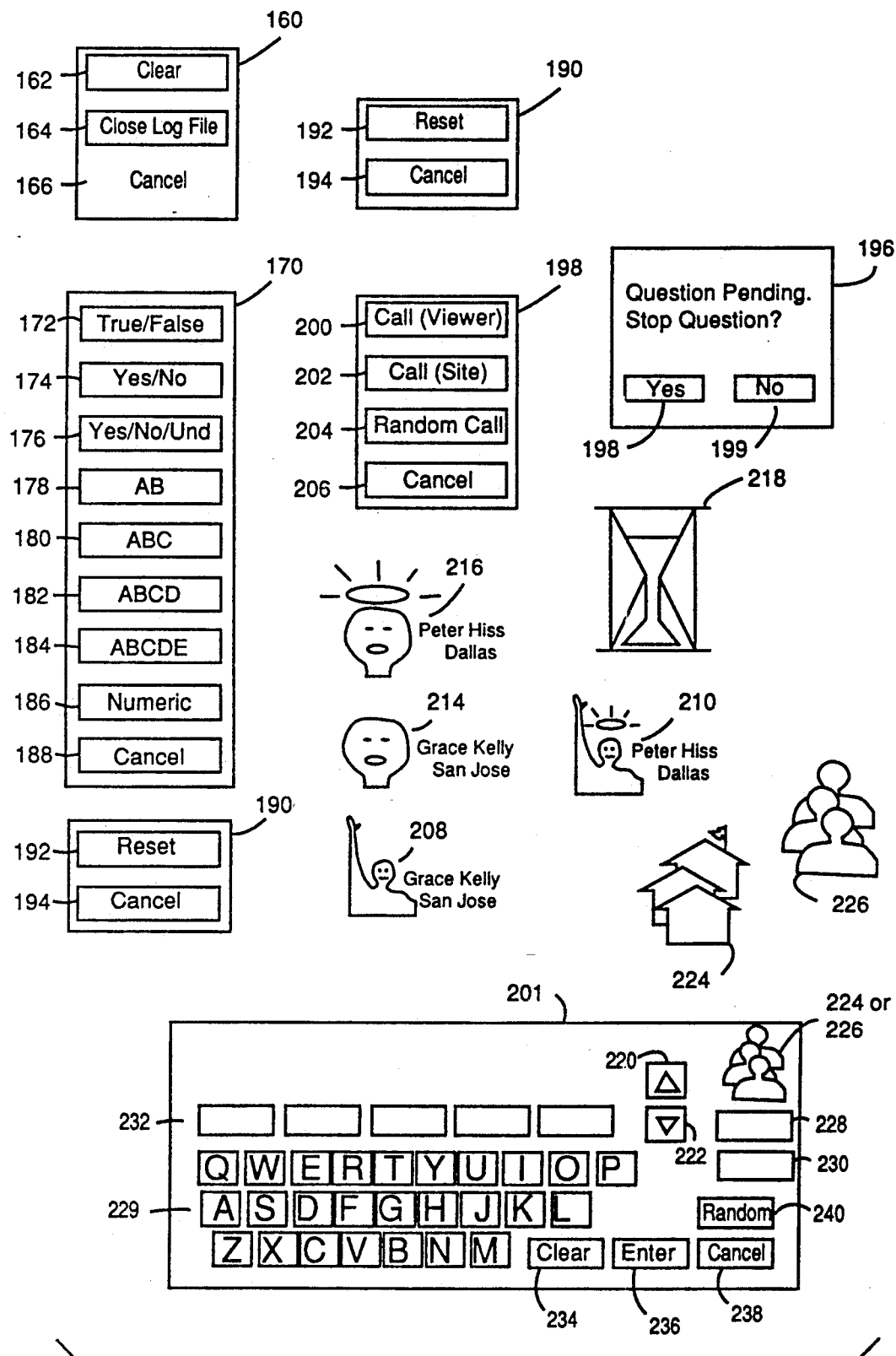
Fig._4A

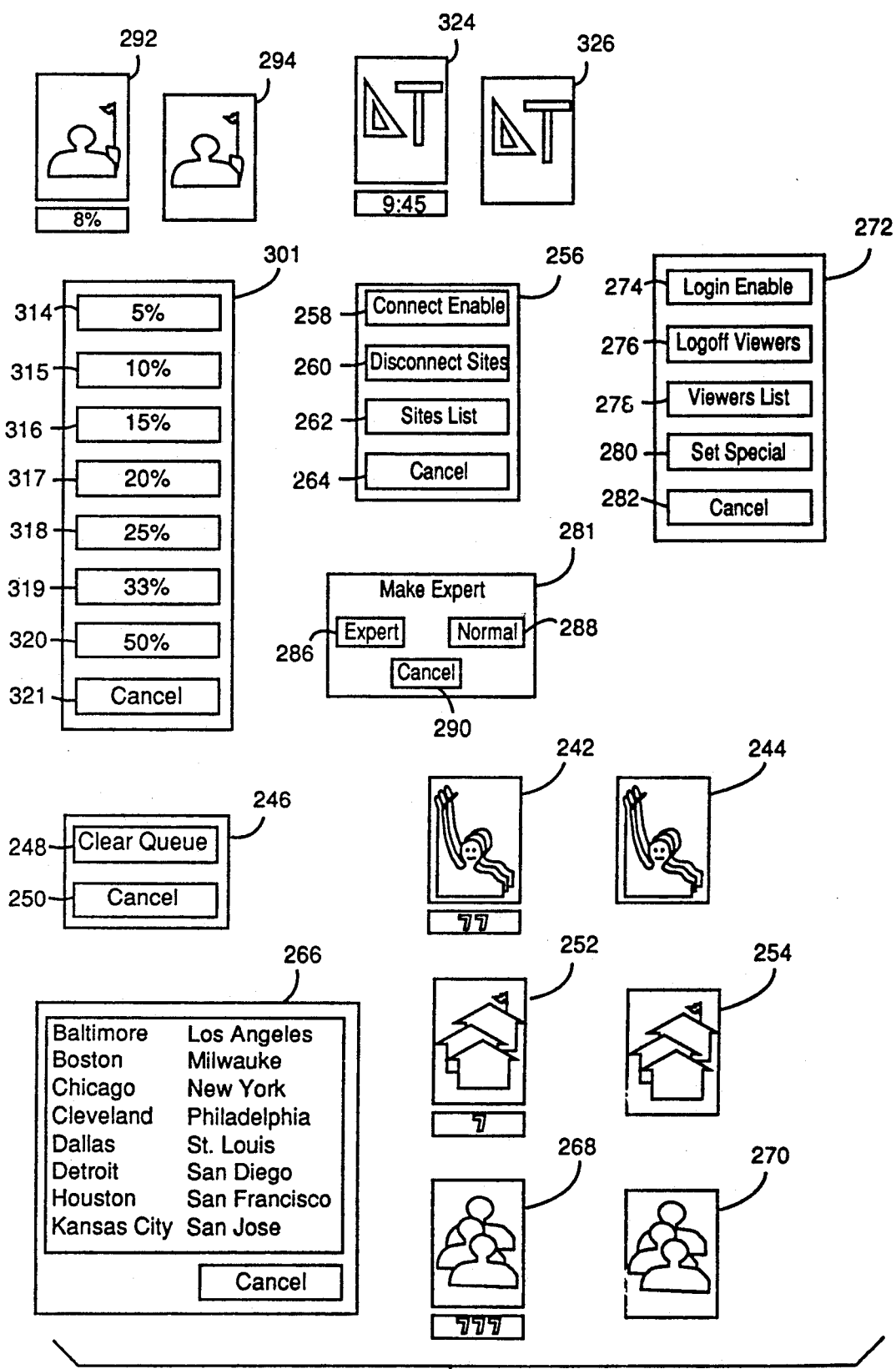
Fig._4B

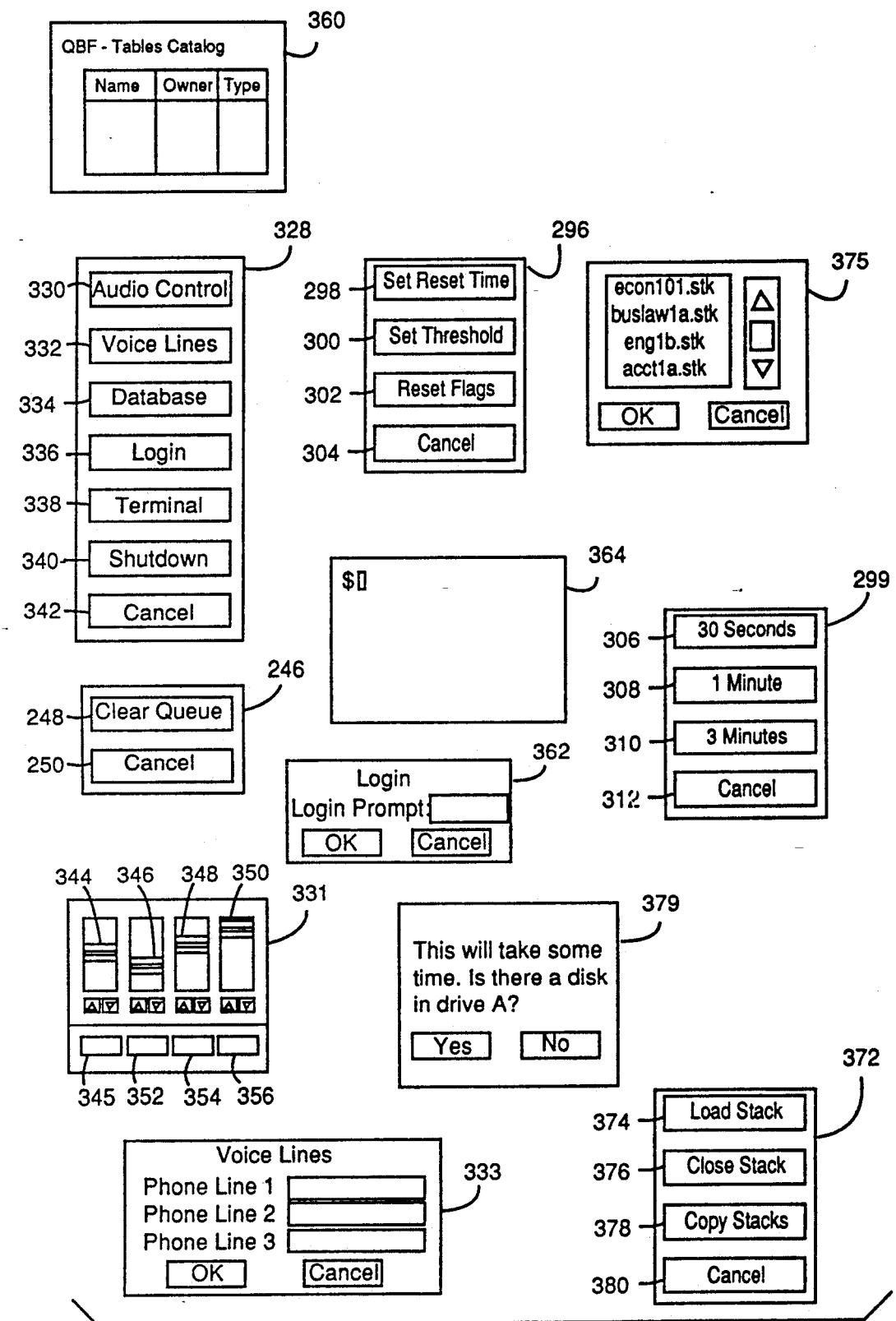
Fig._5

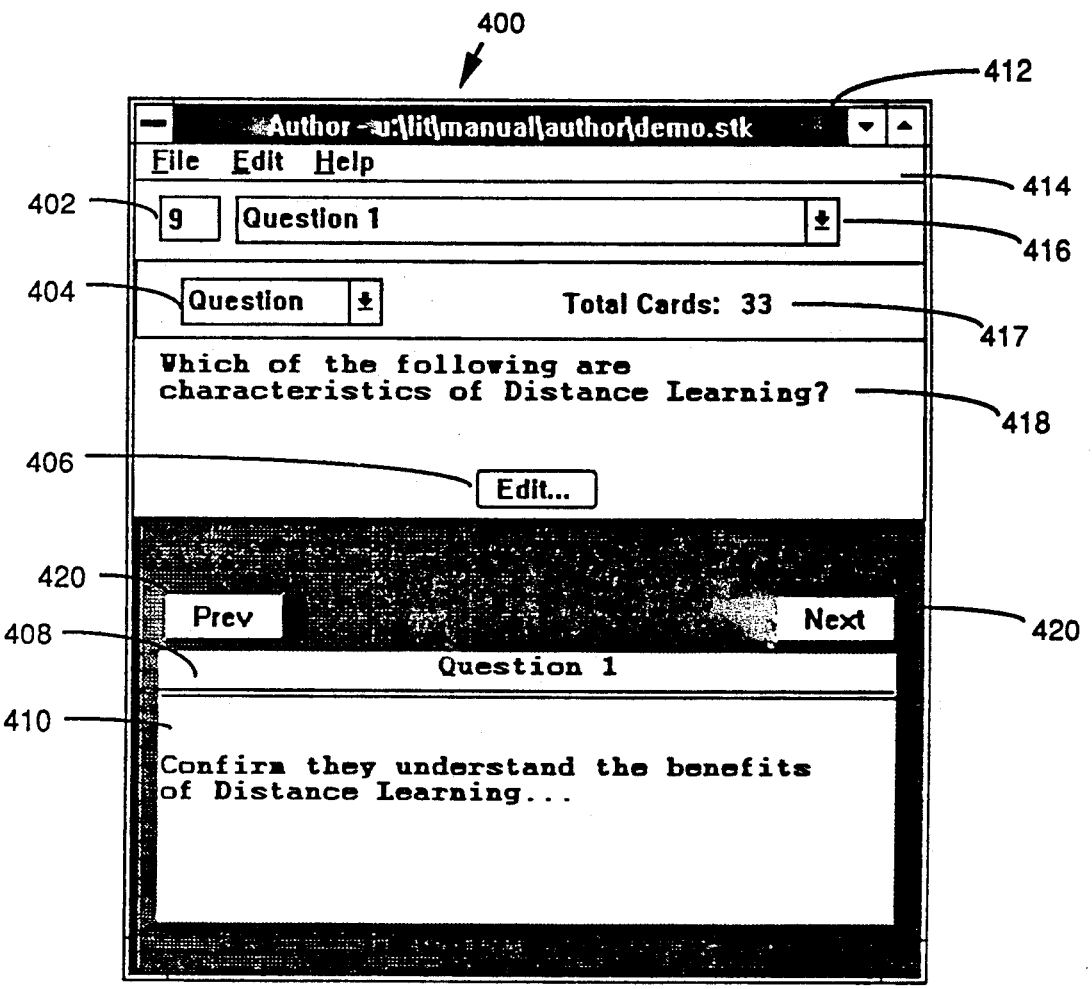
Fig._6

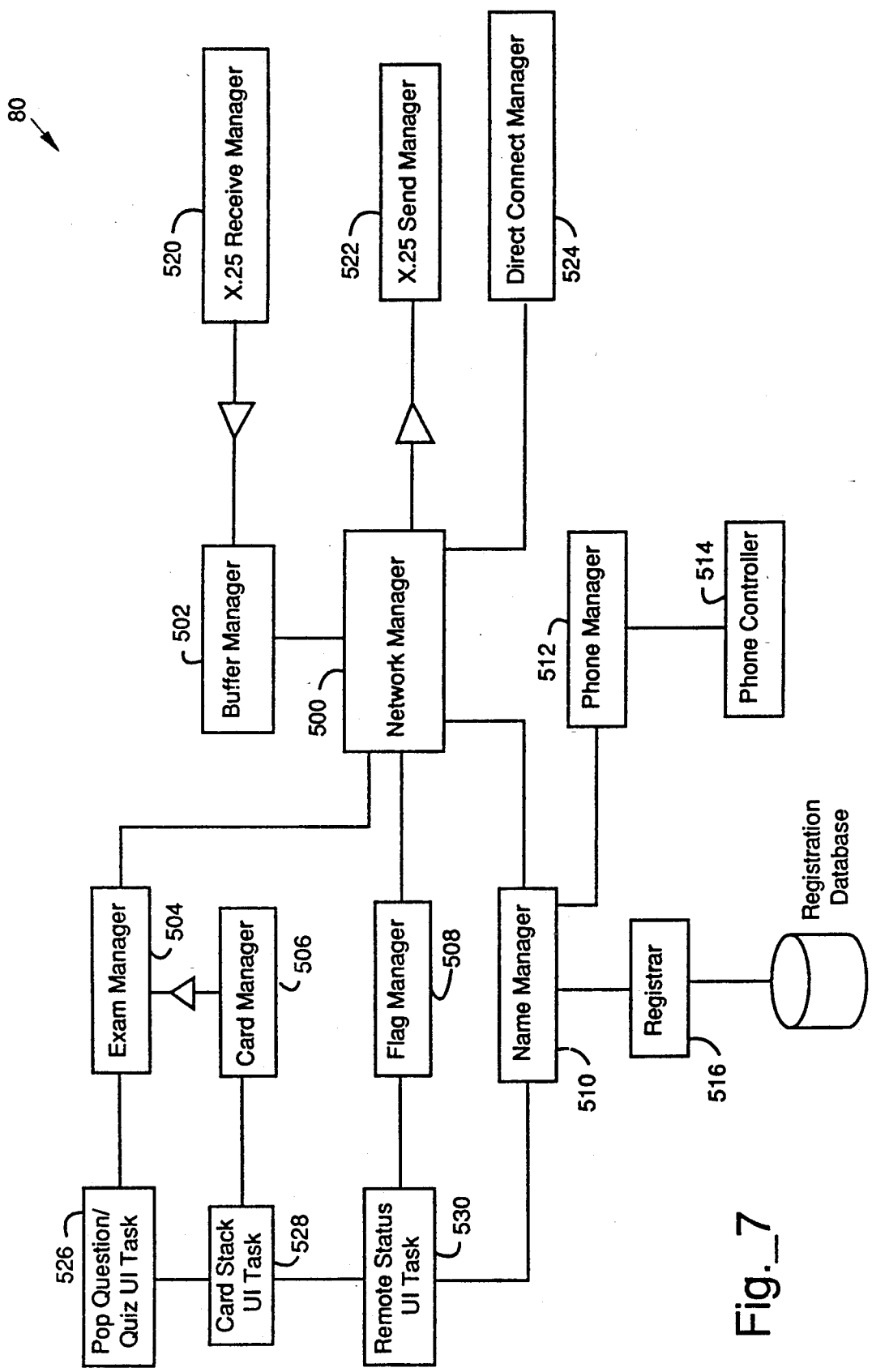
Fig._7

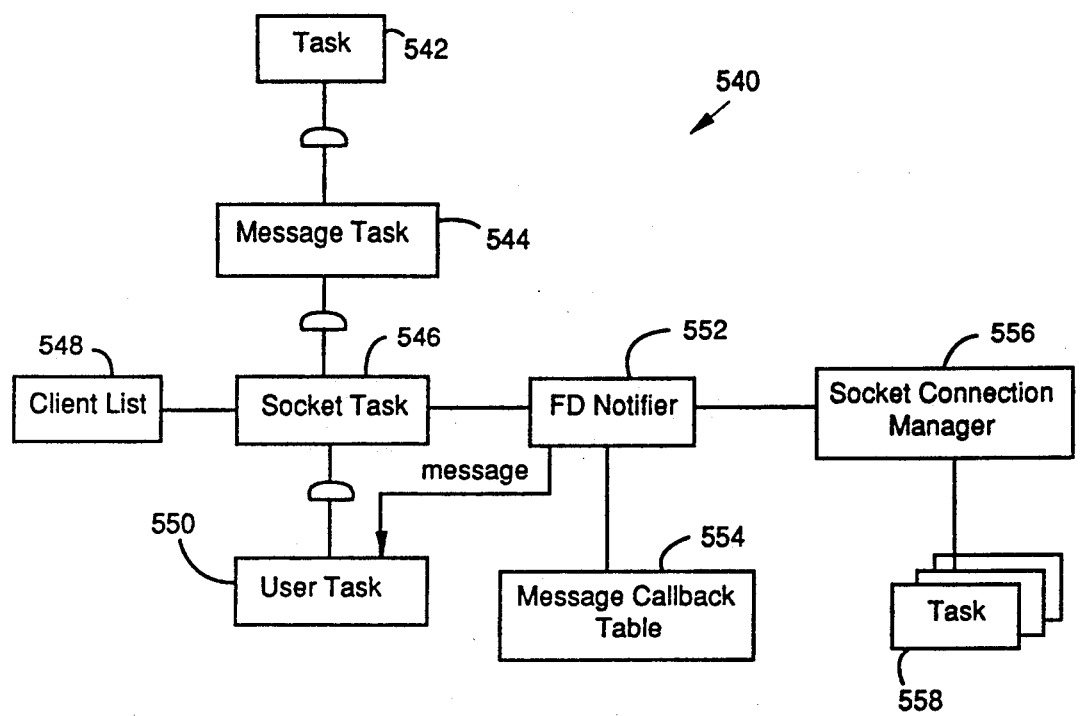
Fig._8
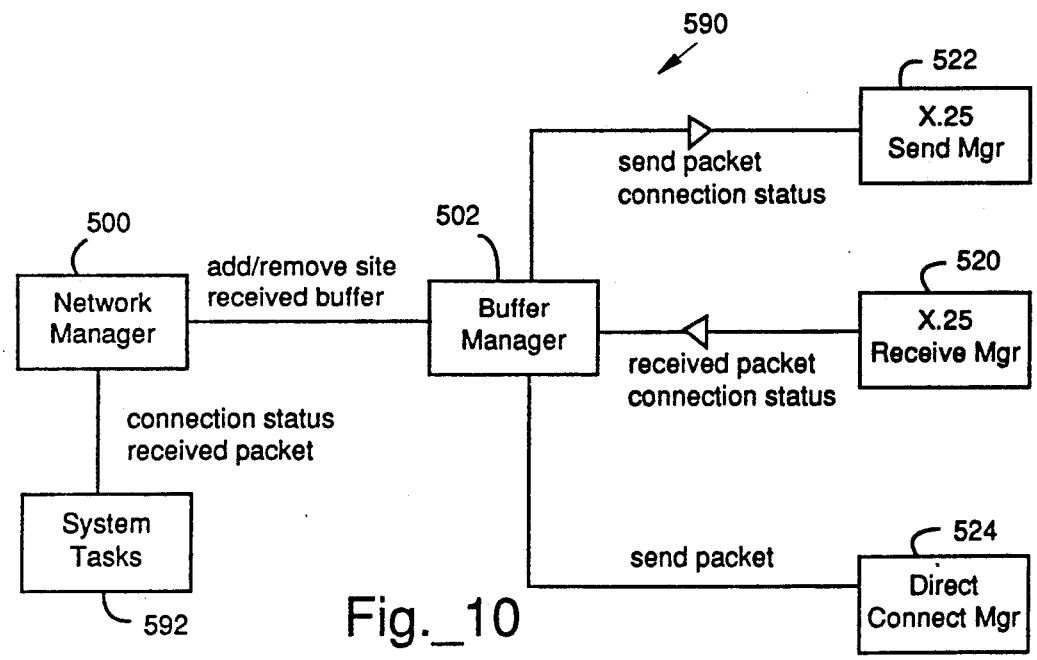
Fig._10

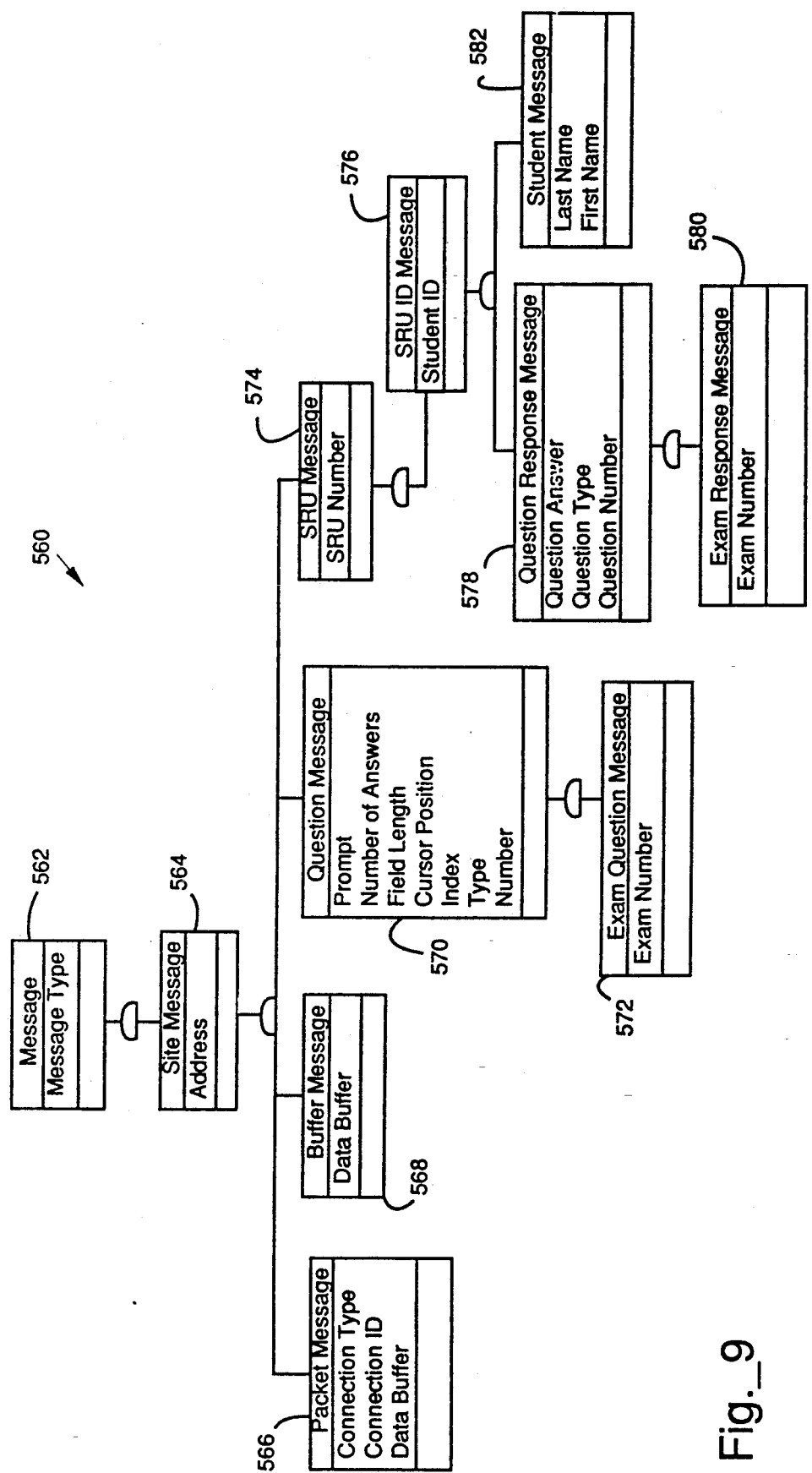
Fig._9

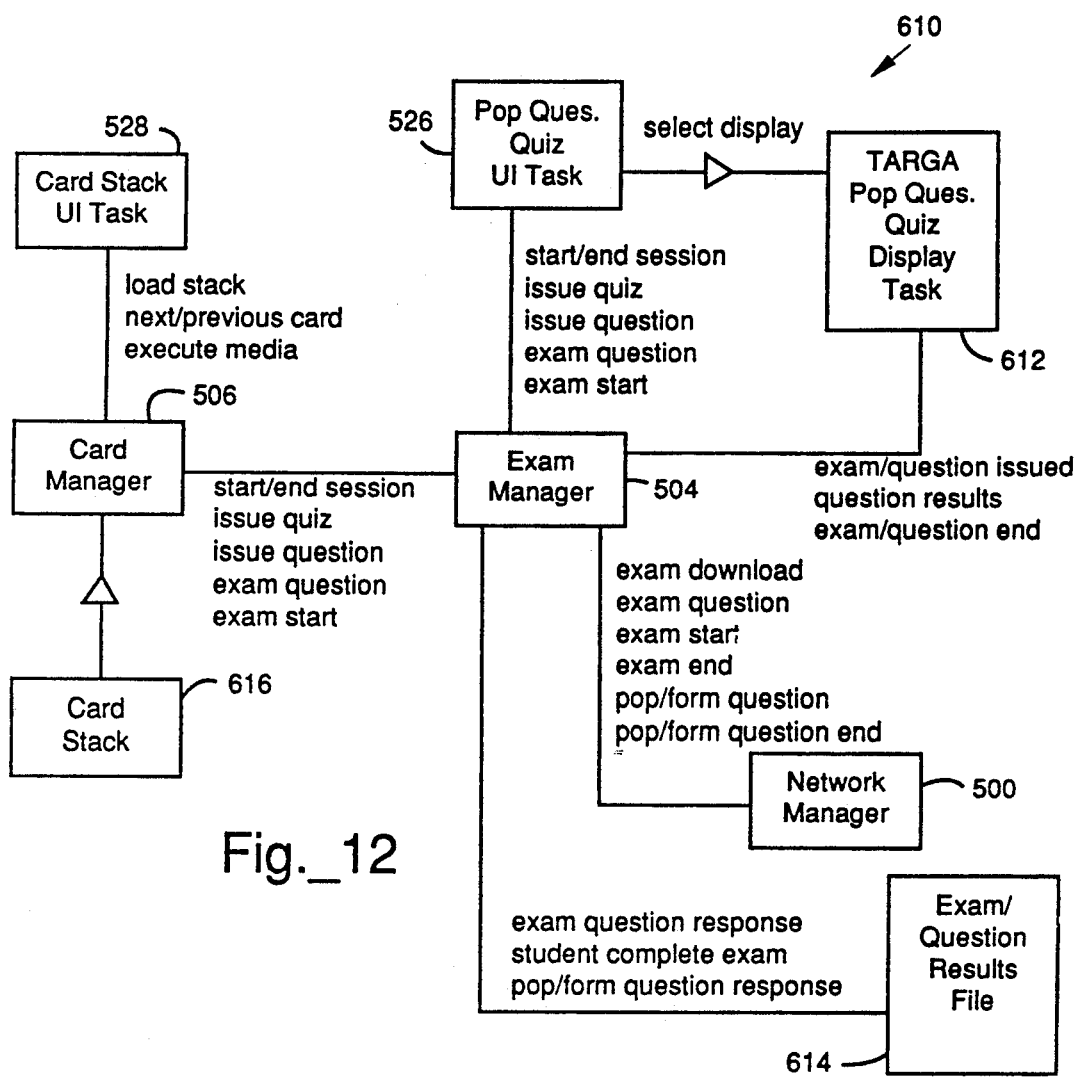
Fig._12
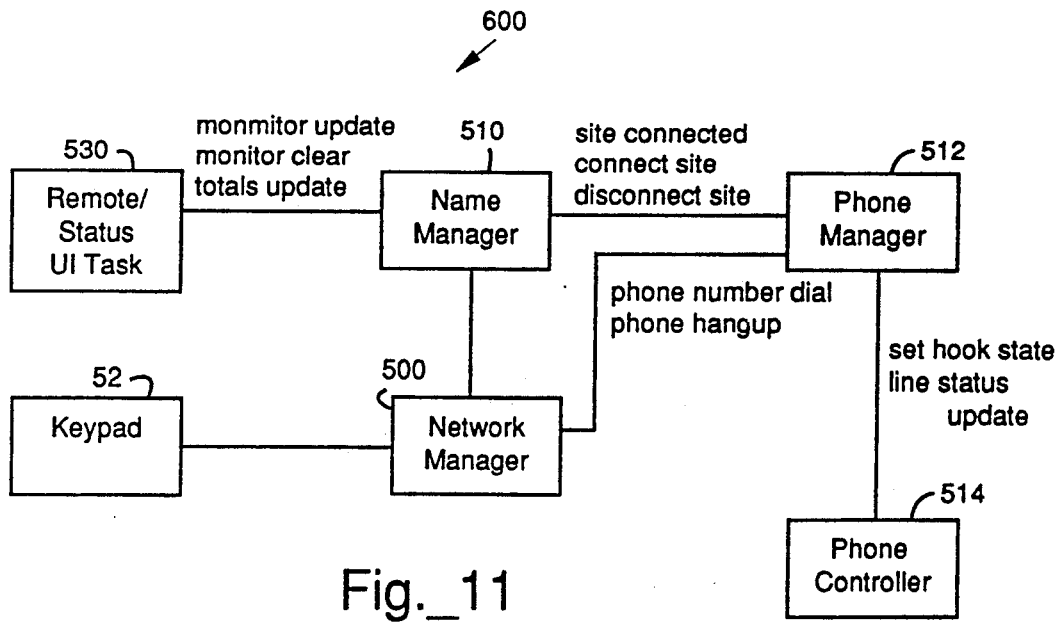
Fig._11

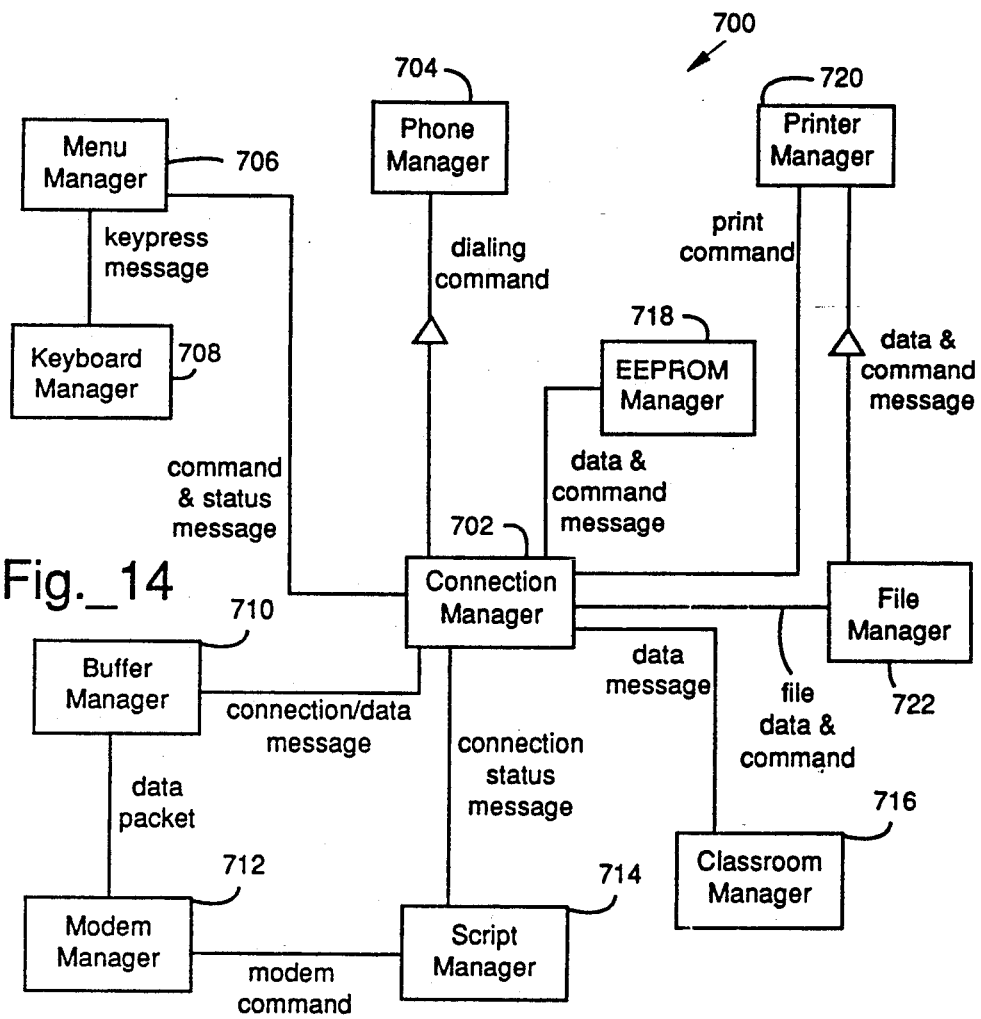
Fig._14
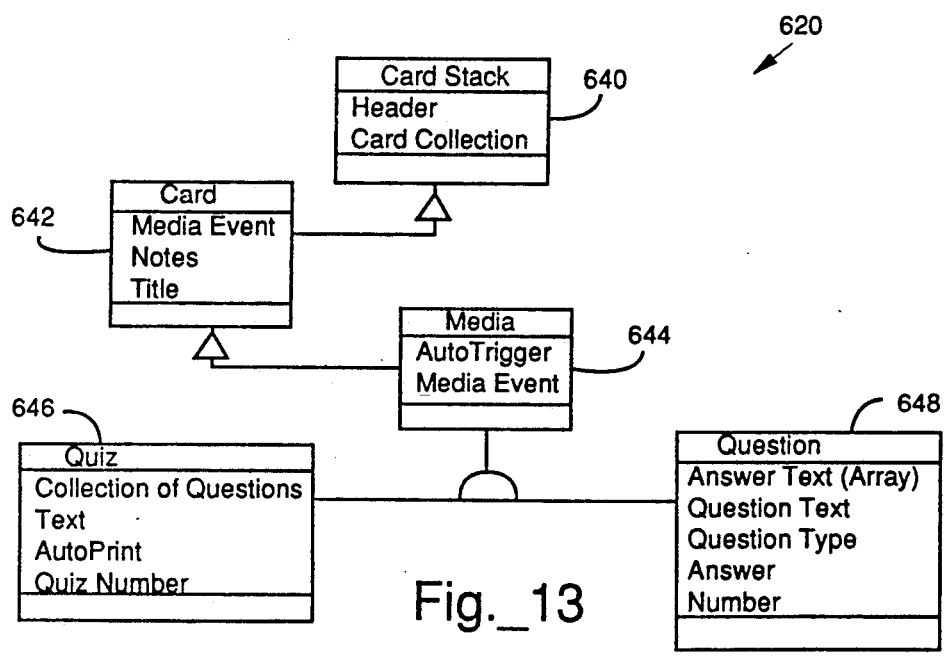
Fig._13

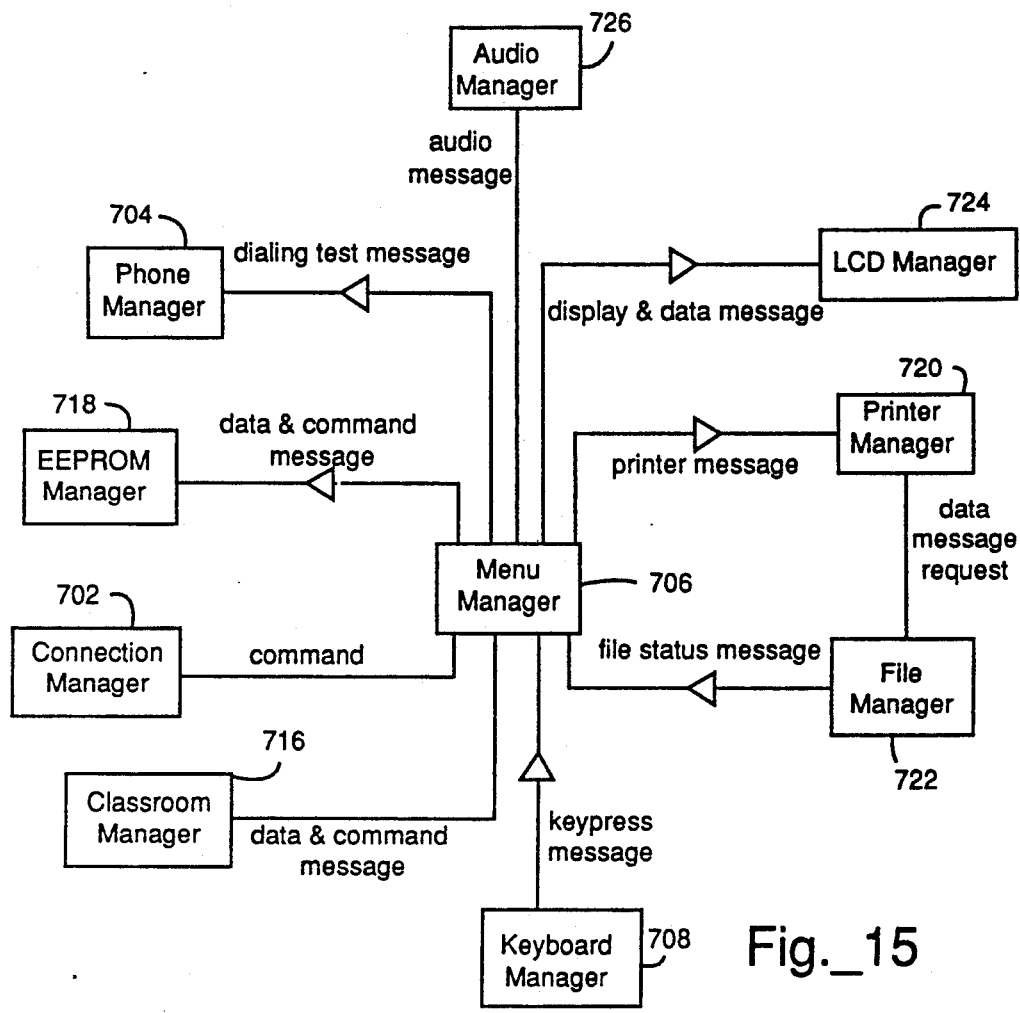
Fig._15
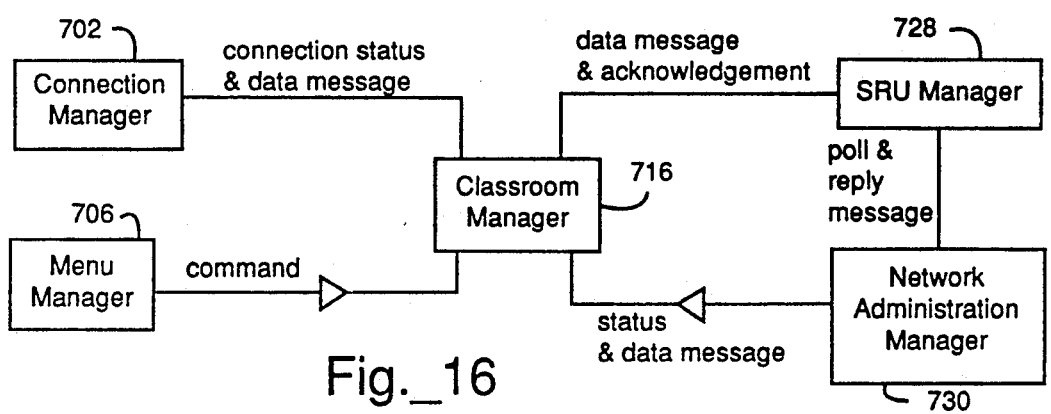
Fig._16

COMPUTER-IMPLEMENTED METHOD AND APPARATUS FOR REMOTE EDUCATIONAL INSTRUCTION

CROSS-REFERENCE TO RELATED APPLICATIONS

DAISY CHAINABLE VOICE-DATA TERMINAL, Ser. No. [unknown], filed Mar. 25, 1992, inventors Gary D. ALFORD and Robert E. SELLERS, assigned to assignee of the present invention; and SITE CONTROLLER WITH ECHO SUPPRESSION, Ser. No. [unknown], filed Mar. 25, 1992, inventors Robert E. SELLERS and Gary D. ALFORD, assigned to assignee of the present invention.

BACKGROUND OF THE INVENTION

1. Field of the Invention

The invention relates generally to computer-based remote communications systems and specifically to methods and systems incorporating site controllers for user keypad terminals with digital logic and microphone pickups that can be strung in a daisy chain of identical terminals.

2. Description of the Prior Art

Technology, in its various forms, has allowed the instructional classroom to be extended beyond the traditional campus to remote student locations by telecommunications. Community colleges have been offering telecourses for academic credit nationwide for at least the last ten years. Students in their homes may tune into tape recorded video series that are broadcast by PBS TV stations at regular times. Then, two or three times a semester, the telecourse students may meet on campus to take mid-term and final examinations. Usually a regular instructor has responsibility for conducting the tests and helping enrolled students during the progress of each telecourse. Currently, lower division undergraduate credit can be earned in this way in oceanography, geology, mathematics, business, and marketing, to name a few. Successful students learning with this form of instruction do so in spite of a lack of close contact with an instructor and sacrifice the ability to ask questions during lectures. One advantage is that telecourses are relatively inexpensive for all those involved because the local community college merely synchronizes itself with the schedule decided by a local PBS TV station that typically serves a region comprising several community college districts. The television station bears the expense of studio and transmitter equipment and the software when a video tape is provided in a syndication. The students need only to tune in a television receiver he or she may already own.

Businesses very often find it easier to cover the cost of more exotic teleconferencing and teleinstruction to conduct conferences and instructional sessions. Teleconferencing permits two-way picture and sound communications with the participants, but is much more expensive than ordinary telephone conferencing since special purpose video equipment and a video grade channel are needed to interconnect the parties. Teleinstruction allows a special interest class to be convened and communicated across town or across country on a secure channel if needed. Large, international companies use teleinstruction to train their sales forces that are physically located at various locations throughout the world. Traditional teleinstruction has not permitted individual students to communicate in real-time with the instructor, except as a member of a single site with a common audio channel.

There is a need for a system for remote distance education that permits an instructor to be informed of which students at remote sites wish to speak and to enable students desiring to speak to the instructor to have an individual audio channel communicating back to the instructor's studio facility.

What is needed is a system for remote distance education that permits an instructor to see which students at remote sites wish to speak and to enable a selected student to have an individual audio channel back to the instructor's studio facility.

SUMMARY OF THE PRESENT INVENTION

It is therefore an object of the present invention to provide a system for remote educational instruction.

It is a further objective of the present invention to provide a viewer response system that extends the traditional challenge of a classroom to an instructional broadcast.

It is a further object of the present invention to provide an interactive network that allows students at remote sites to ask an instructor questions live on the network.

It is a still further object of the present invention to provide an educational support system that allows an instructor to issue questions that can gauge viewer comprehension in real-time during a presentation.

Briefly, a preferred embodiment of the present invention includes a viewer response system comprising a host site and at least one remote site interconnected by a satellite channel for host-to-remote video, an X.25 communications channel for message exchanges that establish a virtual circuit between each remote and the host site and a dial-up public phone network channel that allows a remote site to dial the host site in response to a student at the remote site wanting to speak on the system to an instructor at the host site. A touch screen monitor at the host site allows the instructor to sequence through electronic notecards that function as presentation cue cards. Pop questions and quizzes can be formatted on remote site monitors and keypad terminals for each student at each remote site thus allowing real-time answers to be entered. A computer supporting the host site computes and displays remote site status and student responses, and logs the responses on disk memory.

An advantage of the present invention is that a system is provided that gets and maintains viewer interest in a presentation coming from a remote host site by satellite because each viewer can individually request and get a channel to talk to the instructor during the session.

Another advantage of the present invention is that a system is provided in which real-time viewer comprehension feedback is provided to a presenter, even over a widely distributed network of viewers, that allows a presenter to adjust the pace and level of the material to fit the audience.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of an instruction system having a studio site for an instructor and a remote site for a number of students which are interconnected by a satellite video channel, an X.25 data channel and an audio channel through the public phone network; and FIG. 2 is a block diagram of the host computer included in the system of FIG. 1;

FIG. 3 is a representation of the user interface screen presented on the host site monitor that is included in the system of FIG. 1;

FIGS. 4A and 4B are diagrams of several icons and buttons that can appear on the host site monitor that is included in the system of FIG. 1;

FIG. 5 is a diagram of various menus that can be displayed on the host site monitor that is included in the system of FIG. 1;

FIG. 6 is a representation of an authoring window screen image for the prompter authoring tool;

FIG. 7 is a diagram of the overall process of the viewer response system;

FIG. 8 is a track class hierarchy diagram that applies to the tasks and processes of FIG. 7;

FIG. 9 is a message class hierarchy diagram that applies to the tasks and processes of FIG. 7;

FIG. 10 diagrams the message connections and tasks associated with remote site communication management that relates to the tasks and processes of FIG. 7;

FIG. 11 is a diagram of the call queue management that relates to the tasks and processes of FIG. 7;

FIG. 12 is a diagram of the messages, message connections and tasks for pop question and quiz management;

FIG. 13 is an object diagram of the author card stack;

FIG. 14 is a block diagram of the site controller communication modules;

FIG. 15 is a menu manager interface block diagram; and

FIG. 16 is a classroom manager interaction block diagram.

DETAILED DESCRIPTION OF THE PREFERRED EMBODIMENTS

FIG. 1 illustrates an interactive network 10 comprising a host site 12 and at least one remote site 14. A satellite 16 establishes a first communication channel 18 between sites 12 and 14. A second communications channel 20 includes the X.25 public packet switched network for data. A third communications channel 22 includes the public phone system direct distance dialed (DDD) network for voice communications.

Host site 12 is a broadcast studio having a production control room 24 and a studio 26 for an instructor. The studio 26 includes a touch screen monitor 28, a site controller 30 and a plurality of response keypad terminals 32. The control room 24 has a host computer monitor 34, a host computer 36, an uninterruptable power supply (UPS) 38, a phone controller 40 and a broadcast equipment unit 42. The system 10 may further include a satellite communications uplink 44 associated with host site 12. Remote site 14 is a classroom associated with a satellite communications downlink 46, and comprising a television monitor 48, a site controller 50, and a plurality of response keypad terminals 52 on a daisy chain cable 53. Site controllers 30 and 50 are similar, as are response keypad terminals 32 and 52.

In operation, a video image of the instructor is sent from host site 12 to each remote site 14 via communications channel 18. Data between the instructor and a plurality of students individually associated with a response keypad 52 are exchanged via communications channel 20. The voice of a selected student is communicated to the instructor via communications channel 22. A student wishing to speak to the instructor presses a button for this purpose on a respective response keypad 52. The instructor selects which, if any, student he or she wishes to enable to speak by touching an appropriate icon displayed by touch monitor 28. Host computer 36 reads the selection at touch monitor 28 and sends an enabling signal to site controller 50 via communications channel 20. A microphone within the corresponding response keypad unit 52 is connected through the cable 53 and a voice channel is opened up back to the instructor via communications channel 22. Site controller 50 dials an appropriate phone number to enable the connection of host site 12 to communications channel 22. Phone controller 40 manages as many as three incoming phone calls from remote sites 14. Phone controller 40 comprises a front panel with indicators to show ringing and off-hook status of three incoming phone lines and may be controlled by an embedded microcomputer, such as an Intel 80C31.

Host 36 is a UNIX-based computer that is the foundation of an interactive network. Host 36 gives a presenter immediate two-way access to each viewer, creating a classroom situation that captures everyone's full attention. Straightforward touch screen or mouse driven controls let the presenter manage incoming questions, call on specific viewers, and monitor overall audience comprehension. Convenient prompter cue cards help the presenter keep track of material. Visual aids in icon form show how many people are watching and how well the material is being understood. Host 36 enables the presenter to ask pop-questions and to administer planned quizzes. Broadcast-quality video is displayed ultimately on monitors 48, and allows viewers to see questions and results clearly. Results data may be stored for a later, off-line analysis. A call queue helps the presenter field questions. Phone controller 40 is an automatic, multi-line type that supports two-way and three-way voice conversations.

Site controller 50 is a compact communication device that coordinates voice and data transmission between response keypad terminals 52 and host computer 36. One site controller 50 coordinates communication for up to sixty-four terminals 52 at a remote site. Site controller 50 controls and places calls from viewers and electronically notifies a presenter that a particular viewer is logged in, allowing the presenter to call on the viewer by name and location. Two phone lines are required to complete a connection from remote site 14 to host 36. The first line transmits voice from microphones included in terminals 52. The second line is used to reinforce verbal interaction by transmitting data such as call and flag signals and numeric and multiple choice answers to questions that may be transmitted from host 36. Site controller 50 supports multiple set-ups, allowing remote site 14 to connect to different host sites 12. Audio "ducker" circuitry provides an echo/feedback cancellation and can be adjusted either locally or remotely from host site 12. The co-pending applications referred to above provide more detail on the ducker circuitry. A built-in modem and an automatic voice dialing circuitry simplify equipment needs. ASCII files can be downloaded from host 36 for output to printers (not shown) at remote site 14, allowing written material to be distributed by a presenter quickly and easily.

The response keypad terminals 52 are small desktop devices that support an audio and data link between a viewer at a remote site 14 and a presenter at host site 12, e.g., during a business television broadcast. The built-in microphones included in response keypad terminals 52 allow viewers to speak to the presenter without requiring either to deal with conventional phones or necessitating leaving their seats. This helps the continuity of the presentation and enhances a classroom interaction environment.

Pressing a call key at a response keypad terminal 52 will signal to the presenter that a particular viewer has a question or comment. The viewer's call request message is put in a call queue as hereinafter detailed. When a presenter calls on a viewer, the microphone in the corresponding keypad terminal 52 activates and everyone on the network can hear the subsequent two-way conversation. Pressing a flag key at a keypad terminal 52 indicates to the presenter, discreetly and anonymously, that the viewer is having trouble understanding the material. Daisy-chain connection 53 allows sixty-four terminals 52 to be connected to each site controller 50.

Viewer response system phone controller 40 is a telecommunications control device that manages incoming phone calls from remote sites 14 to host site 12. By handling up to three incoming calls at a time, phone controller 40 eliminates the need for switchboards and telephone operators, frees a presenter to focus on viewers statements, and reduces the costs usually associated with live interaction. Front panel indicators on phone controller 40 show the ringing or off-hook status of the three incoming phone lines. Phone controller 40 can interface to an optional digital hybrid system, which would allow viewers from sites outside system 10 to call the presenter using standard telephones. Touch monitor 28 preferably has a twenty inch high resolution color display. Monitor 34 may be a sixteen inch high resolution type. Host computer 36 has a communications interface 72 for a modem and X.25 PAD at 9.6 K baud to 64 K baud.

FIG. 2 illustrates host computer 36 which comprises a 486/33 PC/AT computer including a central processing unit (CPU) 60, a 32 M byte random access memory (RAM) 62, a 330 M byte disk 64 with a small computer systems interface (SCSI), a UNIX multi-tasking operating system 66, an NTSC/PAL video interface 68, and a mouse 70. A RS-232 serial port 74 may be connected to studio site controller 30. A RS-232 serial port 76 provides for connection to phone controller 40, and a RS-232 serial port 78 provides for connection to the touch screen monitor 28. UNIX operating system 66 hosts a pair of applications programs, a viewer response system (VRS) 80 including several independently executing processes. A prompter authoring tool (PAT) 90 operates on MS-WINDOWS. Site controller 50 must communicate with viewer response system 80 and include a program that supports interaction with viewer response system 80.

VIEWER RESPONSE SYSTEM

In operation, viewer response system 80 provides a computer-implemented method for providing an interactive system that simulates the traditional classroom environment in business television broadcasts, as briefly described above. Viewer response system 80 puts a presenter in touch with each member of an audience at remote sites 14 through audio and data communications. This can encourage viewer participation and enhance comprehension and information retention, thus making distance learning more effective. Viewer response system 80 communicates with a presenter at touch screen monitor 28 with a set of icons (also referred to as buttons) displayed on screen 28 that are touched by hand to activate some associated procedure.

FIG. 3 illustrates a user interface (UI) 92 that is presented on monitor 28. UI 92 comprises four quadrants, the first quadrant is a response group 94 which includes a response monitor 96, a response button 98, a response check icon 100 and a stop button 102. The second quadrant of UI 92 is a question group 104 which includes a question monitor 106, a question icon 108, a question button 110 and a question check icon 112. The third quadrant of UI 92 is a prompter group 114 that includes a prompter monitor 116, a prompter button 118, a prompter next card button 120, a prompter previous card button 122, a question button 124 and an icon 126. The fourth quadrant of UI 92 is a remote group 128 that includes a pair of remote monitor buttons 130 and 132, a pair of remote buttons 134 and 136, a flag icon 138 associated with a tally icon 140, a viewers (students) icon 142 and associated tally icon 144, a sites icon 146 and associated tally icon 148, a callers icon 150 and associated tally icon 152, a tools icon 154 and an associated tools icon 156.

In operation, response monitor 96 displays incoming answer summaries from the remote sites 14. The displayed response represents the amalgamation of answers from viewers that have answered a current pop question or preformatted question before the time is up. A stop question button that appears on screen can be used to stop an existing pop question. It also ends any preformatted questions and exams in progress. Response check icon 100 causes the correct answer (one of the bars in the bar chart) to be highlighted in the response window 96. The response button 98 calls up a response pop-up menu 160, as illustrated in FIG. 4A, that includes a clear icon 162 that removes a result graphic for a particular question and the associated graphic text (e.g., the question window). A close log file icon 164 saves the current file and opens another. A cancel icon 166 puts the pop-up menu away.

The question monitor 106 displays the text and possible answers to a preformatted question. Selecting the question monitor 106 allows any text and answer choices to be broadcast to remote sites 14. Question icon 110 calls up a pop question menu 170 (FIG. 4A) that includes a true/false button 172, a yes/no button 174, a yes/no/undecided button 176, a AB button 178 for two answer choices, a ABC button 180 for three answer choices, a ABCD button 182 for four answer choices, a ABCDE button 184 for five answer choices, a numeric button 186 and a cancel button 188. Numeric button 186 allows a viewer to type in a number for arithmetic answers. The question check icon 112 causes the correct answer in the question window 106 to be highlighted. The question button 110 will produce a question pop-up menu 190 that includes a reset icon 192 which sets the pop question number back to one, and a cancel icon 194 that puts the pop-up menu away.

A quiz/question pending alert box 196, illustrated in FIG. 4A, will appear on the screen of monitor 28 if an attempt to issue a new question or quiz is made while one is already pending. A yes button 198 stops the previous quiz/question and issues the new selection. When selected, the pending alert box 196 is put away. A no button 199 abandons the issuing of any new question/quiz and allows the previous question/quiz to be completed.

The remote monitor button 134 or 136 causes a display of participant calling within system 10. The monitor 130 or 132 can contain a variety of icons and text. Selecting a remote monitor button 134 or 136 activates the caller's microphone on a corresponding response keypad terminal 52, making the caller live on system 10 as indicated by turning on a highlight on monitor 28. When a call is complete, a presenter may hang up the line by selecting the remote monitor button 130 or 132 a second time, which turns the highlight off.

Remote buttons 134 and 136 call up a remote pop-up menu 198, as illustrated in FIG. 4A, that includes a call viewer icon 200 that calls up a viewer search keyboard 201 (FIG. 4A). A call site icon 202 also calls up the site search keyboard 201. A random call button 204 calls on a viewer which has been randomly chosen. A cancel button 206 puts the pop-up menu 198 away.

A (normal) caller icon 208 (FIG. 4A) displays the name and location of an individual viewer (student) who wants to ask a question and is requesting to be acknowledged. A red expert caller icon 210 shows in monitor 130 when an expert caller is waiting to be acknowledged. Expert callers have priority over normal callers. A green speaking icon 214 is displayed when a caller is currently switched on and is live on system 10. A green expert icon 216 is displayed when an expert is currently speaking and is live on system 10.

A dialing icon 218 (FIG. 4A) is displayed when the instructor has called on a participant, and that the participant has not yet connected. After connecting, the icon 218 will change to a speaking icon.

The viewer/site search keyboard 201, as illustrated in FIG. 4A, is used (after it pops up on screen) to select an audio channel from a specific viewer or remote site 14 to be received. The user (instructor) touches-in the first three letters of the last name of the viewer or site 14. After entry of the third letter, viewer response system 80 will begin searching for those sites/viewers that are currently logged into the system. The viewers or sites that have names that match are displayed in the search display on monitor 28. If more than five matches are found, a pair of up and down arrow buttons 220 and 222 appear on screen to allow the user to scroll up and down to the previous or the next page. Viewers and sites to be selected are chosen by pressing a search display button containing particular name of the individual or remote site 14. A pair of icons 224 and 226 denote the search keyboard type, site or student. An input display 228 shows the text characters as they are entered via a set of typewriter buttons 229. A descriptor 230 reminds a user what is needed to begin the search. Five positions of a search display 232 present the search findings. The first and last names of viewers and/or site locations will be written out. When the desired display is touched, the corresponding viewer is called on and the viewer/site search keyboard 201 is put away. The selected viewer is then placed in the remote monitor window 130 or 132 (FIG. 3) from which the search was initiated. A clear button 234 clears any input and/or search findings, thus allowing new text to be entered. A enter button 236 accepts input from one or two characters, rather than the three to begin a search. A cancel button 238 cancels the operation and puts the keyboard away. A random button 240 selects randomly throughout system 10 to chose one viewer or site. Random button 240 brings up list items at random.

A callers display 242, as illustrated in FIG. 4B, shows the current number of non-speaking callers that are not represented in the remote monitors 130 and 132. A callers icon button 244 calls up a callers pop-up menu 246 that includes a clear queue button 248 that clears the entire call queue including disconnecting any calls and removing icons and names from remote monitor buttons. It does not, however, clear those individuals already speaking. A cancel button 250 puts the pop-up menu 246 away.

A sites display 252 (FIG. 4B) shows in a legend box the current number of remote sites 14 that are then currently logged onto host site 12. A sites icon button 254 calls up a sites pop-up menu 256 that includes a connect enable button 258 which allows sites to connect to the system. A disconnect sites button 260 logs off all sites currently logged on. A sites list button 262 calls up the sites list display. A cancel button 264 puts pop-up menu 256 away. A sites list display 266 contains an alphabetical list of all remote sites 14 currently logged on. No commands can be executed at this level except to cancel.

A viewer display 268 (FIG. 4B) shows the current number of participants logged onto system 10. A viewer icon button 270 calls up a viewer pop-up menu 272 that includes a logon enable button 274 that controls login by toggling enable/disable of login. A logoff viewers button 276 logs off all currently logged in viewers. A viewers list button 278 calls up the site search keyboard 201 for the selection of a particular site. A set special button 280 calls up a make expert selection box 281 and allows the user to designate expert status to a particular viewer. A cancel button 282 puts the pop-up menu 272 away. A viewer list display 284 contains an alphabetical list of all the viewers currently logged on at the selected site 14 with site search keyboard 201. The make expert selection box 281 has an expert button 286 that calls up the viewer search keyboard and allows the user to designate particular viewers as experts and to give them a priority status when they call in. A normal button 288 returns a specified viewer to normal status. A cancel button 290 puts the popup menu 281 away.

SYSTEM COMMUNICATIONS

In further explaining the concepts of host-to-remote and remote-to-host communications, the site login is initiated after a virtual circuit has been established between the site controller 50 and the viewer response system host system 80. A site registration request message, including the site address, is sent to the host site 12 from the site controller 50. If a site with a corresponding address is found in the sites database on the host, the host 12 will respond with a site number assignment message indicating that the login request was successful. If the login attempt was not successful, the host 12 responds with a site login failure message with a one byte type code indicating the cause on the failure.

After a successful login, site controller 50 sends a initialize site message with an initialization request level, at which point the host site 12 responds will all messages required to initialize a site controller 50. These messages include define response keypad terminal 52 display messages, followed by a login setup message and finally a initialize site end message. The define response keypad terminal 52 display message is used to load common display messages into the response keypad terminal 52 display table. They are also stored locally in site controller 50 such that when a response keypad terminal 52 is reinitialized the display messages can be retrieved locally and sent instead of being downloaded again from the host site 12. The login setup message defines the student login prompts and the ID input field width to be used for student login on the keypads. This information is also stored locally. On receipt of the initialize site end message, login is complete. At this point, site controller 50 will setup login prompts on initialized keypads if student logins are enabled (flag included in site number assignment field).

Site logoff can be initiated by site controller 50 or by the host site 12. A site logoff is initiated by the site controller 50 upon sending a site logoff request to the host site 12 system. If the site is currently registered on the host site 12, the host site 12 responds with a site logoff with corresponding command code. Upon receipt of the site logoff message, site controller 50 checks the command code, if a normal code (zero) is received, site controller 50 forwards all existing buffered message packets then clears the virtual circuit. If an abrupt code (one) is received, site controller 50 will not forward any existing message packets, but will immediately clear the virtual circuit. The site controller 50 logs off all logged in keypads at this time.

Student login enabling is controlled by the viewer response system 80 with student login enable messages and by the site number assignment message during site login. The student login enable message contains both a response keypad terminal 52 address and a login enable state. After receiving a login enable message site controller 50 checks the state of the enable flag, if the state is zero (disabled), site controller 50 downloads display messages with a login disabled message to all response keypad terminals 52 not logged in. If the login state is one (enabled), site controller 50 sets up all response keypad terminals 52 not already logged in with a login prompt utilizing terminal input messages. The response keypad terminal 52 address field is currently unused and must be zero.

A flag rate display 292 (FIG. 4B), which appears in icon 138 (FIG. 3), indicates the percentages of viewers who have pressed their respective flag key on terminals 52 within a last-flag-reset time. For example, if the flag reset time is set to one minute, then the display shows the percentages of viewers who have pressed their flag during the last minute. A flag icon button 294 calls up a flag pop-up menu 296 that includes a set reset time button 298 that calls up a set reset time menu 299. A set threshold button 300 calls up a set threshold menu 301 (FIG. 4B). A reset flags button 302 resets all flags on system 10. A cancel button 304 puts the pop-up menu 296 away.

The set flag reset time menu 299 lets a presenter choose the length of time a viewer can be included in the computation of the flag rate percentage by a thirty second button 306, a one minute button 308, and a three minute button 310. A cancel button 312 puts menu 299 away.

The set flag threshold menu 301 (FIG. 4B) allows the user to set the flag threshold to a desired level. The threshold is the percentage at which the user interface 292 changes color from normal (e.g., blue color) to another status (e.g., red color). A set of buttons 314–320 are used to enter the percentages indicated on the buttons; A cancel button 321 puts menu 301 away.

A tools display 324 shows the current time and allows the user to access maintenance and configuration tools. A tools icon 326 calls up a tools pop-up menu 328 that includes an audio control button 330 that calls up an audio control panel 331. A voice lines button 332 brings up a panel 333 (FIG. 5) so the user can modify or enter phone numbers for the three incoming voice lines. A database button 334 allows the user to view and modify the current database of participants and sites. A login button 336 allows the user to enter a login message for the keypads. A terminal button 338 allows the user to directly access the operating system. A shutdown button 340 shuts down viewer response system 80. A conventional confirming dialog box will appear prior to the execution of the command to verify the user intends to do this particular action. A cancel button 342 puts the pop-up menu 328 away.

Audio control panel 331 (FIG. 5) allows a user to adjust a set of digitally adjusted audio potentiometers included in site controllers 50 via host 36. Control panel 331 includes a site gate button 344 that sets the threshold at which remote site participants' voices will engage an associated mute circuit. To save any changes, an OK button 345 must be selected. A site delay button 346 adjusts how long the mute stays on after an initial trigger, and is typically adjusted to compensate for a 0.4 second delay due to satellite transmission (channel 18 in FIG. 1). A host gate control button 348 sets the threshold level at which the host audio level will engage the mute circuit. Lowering the value will increase the sensitivity of the circuit. For a typical −10 dB input (standard consumer VCR levels) this setting is approximately thirty, on an arbitrary scale. For a zero dB (studio level audio) this setting is fifty on the same arbitrary scale. When speaking into a microphone at a response keypad terminal 52, a viewer's voice will be heard nearly instantaneously by an instructor in studio 26 because there no significant delay via phone lines. The viewer's voice can then be picked up by the instructor's microphone in studio 26 and retransmitted via satellite 16 back to the viewer's site. The time required for a voice to travel up to the satellite and back down is typically 0.4 seconds for domestic transmissions. A host delay control button 350 sets the amount of delay added to the time muting is applied beyond an initial trigger. An update all button 352 updates and saves the current audio settings for all site controllers 50 and panel 331 is put away on execution of update all. A cancel button 354 cancels the operation and puts the audio control panel 331 away. A restore button 356 restores the original audio settings at remote site 14.

Voice line menu 333 allows a user to enter the incoming phone numbers needed by phone controller 40. A database menu 360 allows users to modify student or remote site 14 database files. A login menu 362 allows each user to enter a login message that will be displayed on the keypads. "Please enter your ID . . ." is a typical message. A terminal menu 364 allows a user to input UNIX commands from within user interface 92. A "yes" entered at a conventional dialog box that appears for confirmation of shutdown button 340 begins a shutdown of system 10, a "no" cancels the shutdown and puts the confirmation dialog box away.

A stack of simulated (3"×5") index notecards 370 representing the presenter's presentation are displayed in monitor 116 to assist a presenter through a presentation. Prompter monitor 116 (FIG. 3) is shown displaying one such notecard 370. A question button issues a preformatted question that had been previously designated in the authoring of the index notecard 370 (see PAT 90 hereinafter described). A quiz button issues a preformatted quiz (multiple questions) designated in the authoring of the index notecard 370. Button 120 pulls up the next index notecard 370 in the stack for display. Button 122 pulls up the previous index notecard 370 in the stack for display.

Prompter button 118 calls up a prompter pop-up menu 372 (FIG. 5) that includes a load stack button 374 that calls up a prompter load stack menu 375. A close stack button 376 closes the current stack and clears the question monitor 106, response monitor 96, and notecards 370 in monitor 116. A copy stacks button 378 calls up a copy stack menu 379. A cancel button puts pop-up menu 372 away. Load stack menu 375 allows a user to select and load the appropriate notecard 370 stack associated with the presentation. Copy stacks menu 379 allows a user to copy stack files from a floppy drive to hard disk 64.

Preformatted questions are designed and developed offline using prompter authoring tool 90. These questions are usually about points that the presenter wants to confirm that the audience understands. The questions are typically issued after the completion of a subject or main point. Touching the question button 124 (FIG. 3) associated with that particular notecard 370 (FIG. 3) causes the question to be immediately downloaded to each remote site 14 (FIG. 1) and then to the individual response keypad terminals 52 (FIG. 1). Simultaneously, a bar graph will appear in response monitor 96. The results of the cumulative answers of those viewers that have answered is computed and displayed. These results will stay in the monitor 96 until either a new question is issued or clear button 162 (FIG. 4A) has been selected. The results may be shared with the audience by selecting response monitor 96. A highlight (e.g., yellow) preferably surrounds monitor 96 to indicate that the information is being broadcast to the audience. To stop a question prior to viewers answering, the response stop icon 102 is used. This is typically done when a representative number of participants have answered, or time constraints restrict further delays.

Quizzes are designed and developed off-line using PAT 90. These quizzes are typically issued after the completion of a session. To issue a quiz, a presenter selects a quiz button associated with the particular notecard 370 (FIG. 3). The quiz is immediately downloaded to each remote site 14 and respective response keypad terminals 52. A numeric representation of the percentage of users that have answered the question is displayed in response monitor 96. These results stay in the window until either a pop question is issued or the clear button 162 has been selected. To stop a quiz prior to viewers completing it, the response stop icon 102 is selected. These quizzes normally will be issued at the end of the session because satellite time is not required. This can reduce user operating costs because the responses are being transmitted through X.25 network 20.

A hard copy of the exam is typically distributed prior to the delivery of the course. This allows viewers to read the exam and respond at their own pace, via response keypad terminal 52.

PAT 90 is a computer-implemented method for scripting of presentation aids. Scripts thus constructed are afterwards loaded into host computer 36 and run under the UNIX operating system 66 to assist presenters during their broadcasts from host remote site 14. The result is more polish to each presentation. PAT 90 can create presentation aids such as the electronic notecards 370, formatted questions and quizzes. The notecards 370 are used as cue cards and thus can help keep a presentation on track PAT 90 may be based on WINDOWS-3.0, by Microsoft Corporation (Redmond, Wash.).

A user session running PAT 90 is comprised primarily of a sequence of prompter notecards 370, which are displayed in a gray area at the bottom of an author window 400, as shown in FIG. 6. A user session is organized around notecards 370 and each user session constructs a presentation to be given later, using viewer response system 80.

Author window 400 includes a card number selector 402, an event select list 404, an event edit button 406, a notecard title 408, a notecard window 410 for notecard 370, a title bar 412, a menu bar 414, a card selection list 416, a number of cards field 417, a question/quiz information field 418 and a pair of card advance and backup buttons 420.

In operation, a notecard 370 has a number associated with it that represents its position in a sequence. The notecard 370 also has a title, that displays in title 408, which is used by the presenter to help organize and remember the contents of the notecard 370.

PAT 90 allows a user to create a quiz or a stand-alone question for issuance with viewer response system 80 at the time of a presentation. A particular quiz or question that is associated with a notecard 370 is paired with it on the display 400. Information field 418 gives information about a quiz or a question that is linked to a notecard 370 displayed in window 410. The user may edit the quiz or question. At presentation time, the user has an opportunity to issue the quiz or question, when the user has reached that notecard 370. Stand-alone formatted questions can be displayed to viewers on monitors 48, as well as to the presenter in question monitor 106. Viewers may enter their responses to the presenter's questions via their keypads terminals 52 at the time of the presentation.

A question in PAT 90 represents a query that a presenter would like to send to the viewers when the presentation reaches a question notecard 370. The text of the question is entered using PAT 90. The possible answers and the type of the question are also selected by the user of PAT 90. Acceptable answer structures may include: multiple-choice (with choices for ABCDE, ABCD, ABC, or AB); numeric; true/false; yes/no; and yes/no/undecided. The type of the question indicates the kind of question and forces the answer to be of that type.

In PAT 90 a user may designate one answer to a question as the correct answer choice. This will later appear on viewer response system 80 in user interface 92. The correct answer preferably does not need to be specified when creating and editing the question. Some questions do not have a right or wrong answer. Stand-alone questions also have a number that indicates where this question belongs sequentially in the user session. Question one is a first stand-alone question in the entire user session, question two is the second question, and so on. The question number is useful when organizing the questions and is printed in the controls section at the top of the screen.

A quiz represents a group of questions the presenter would like the viewers to answer when they reach this notecard 370 in the presentation. In PAT 90, a quiz is a series of questions entered by a presenter and are accessed either sequentially, or by entering the question number. The presentation author enters the substantive contents and format type, for each quiz question. A quiz may have up to forty questions. A quiz title is entered in the quiz description information field 418. The quiz title, used for the presenter to indicate the contents of the quiz, may be printed at the top of the quiz. A quiz has a number that indicates where the quiz belongs in a series of quizzes for this user session. The first quiz in the user session is quiz one, the second quiz is quiz two, and so on. The types of questions in a quiz are the same as for a stand-alone formatted question.

A conventional file menu, such as is commonly used in Apple Macintosh and IBM personal computers with WINDOWS, allows a user to get and save files and to print the contents of a file, including notes, questions and quizzes. A "new" command is used to begin writing a new user session. Selecting new will clear the current set and put the user at the beginning of a new one. The new user session will be named untitled until it is saved by using save or save-as commands. If new is selected before saving the current file, a dialog box will prompt the user to save the current user session. Choosing "yes" will save the prompter notecards 370. Choosing "no" will clear the notecards 370 without saving the file. Choosing cancel will quit clearing of the current user session. An "open" command permits the user to open a file that has already been saved. Choosing open will display a file open dialog box. By using the file open dialog box, the user can select the desired file.

If a user attempts to open a file before saving a current file, a dialog box will prompt the user to save changes before replacing the current notecards 370 with new ones. Save is used to save text already typed onto the screen. Save-as is used to retain an original document and add a similar file. The save-as dialog box will prompt the user to enter the file's user session identity (ID) number of up to six characters. If a name for the file is not selected, then the file name defaults to "AUTHOR.STK".

An edit header identifies the script and allows vital information to be entered. When edit header is selected the header dialog box will be displayed. The fields in the header dialog box may be left empty. The user session ID will default to "AUTHOR" unless changed. The user session ID box is to be a notation to the presenter and will also be used in both AUTHOR and viewer response system 80 systems. The filename shows the title of the file. The total number of notecards 370 in the user session will be displayed in field 417. The presenter name indicates who will be giving the presentation. A brief summary of the information displayed in the notecard 370 file may be entered into the description box.

Viewer response system 80 is preferably implemented with an object oriented language. FIGS. 7 through 16 are data and message flow diagrams describing the structure and function of an object oriented computer software implementation of viewer response system 80. Each box in FIGS. 7 and 10–16 represents a task or a process. Each interconnection line is a message path connection or instance. Those skilled in the art will be able to write source code for viewer response system 80, based on the following discussion relating to FIGS. 7 through 16.

FIG. 7 illustrates viewer response system 80, which is fundamentally a script file, that comprises a plurality of event handlers including a network manager 500, at least one buffer manager 502, an exam manager 504, a card manager 506, a flag manager 508, a name manager 510, a phone manager 512, a phone controller 514, a registrar 516 including a registration database 518, a X.25 communications receive manager 520, a X.25 communications send manager 522, a direct connect manager 524, a popquestion/quiz user interface (UI) task 526, a card stack user interface (UI) task 528 and a remotes status user interface (UI) task 530. Multiple buffer managers 502 can be used to assign a private (captive) buffer manager to handle communications for each remote site 14. The structure of a task class hierarchy 540 within each of these managers and UI tasks, or processes, is diagrammed in FIG. 8. The processes all run in parallel and wait for messages and are a sub-class of a socket task which is an instance of a specialized user task.

FIG. 8 illustrates that the task class hierarchy 540 includes a task 542, a message task 544, a socket task 546, a client list 548, a user task 550, a file descriptor (FD) notifier 552, a message callback table 554, a socket connection manager 556 and a plurality of sockets 558 (one for each possible client). Message task 544 is a sub-class of task 542 and it inherits all the attributes and functions from task 542. Similarly, socket task 546 is a sub-class of message task 544. User task 550 is a subclass of socket task 546. FD notifier 552 handles the messages input from sockets 558. User task 550 redirects the messages that it receives. The user task 550 is allowed to register callbacks in table 554. The user defines a set of dispatch functions that want to hear about particular events. So the user task 550 can be partitioned into several sub-functions that do individual processing for messages. The constructor of the user task signs up for messages of interest by making entries in the callback table 554 through the FD notifier 552, since the FD notifier 552 owns the instance of message callback table 554. When other processes send messages to this process, the FD notifier 552 looks up the messages in table 552 and sends the messages out to the dispatch functions that have been registered by user task.

The basic approach is to sub-class a socket task 546 and add the type behavior and objects needed to implement a particular piece of behavior, such as a flag queue manager. The message transfer scheme is implemented using TCP/IP socket based interprocess communication. (A socket is an interface to a transport level in the OSI model.) The user tasks each have a client list 548, which is a list of events that other clients wish to know about. A process typically starts by signing up with other clients (processes). For example, remotes status UI task 530 signs up as a client to name manager 510 for a register student message so it stays informed of student registrations coming from registrar 516. Each process 540 then waits for messages input from socket 558. An entry in a services file indicates to the various processes what socket numbers a particular process will be listening at.

FIG. 9 illustrates a message class hierarchy 560 that describes how messages that pass between the processes are constructed. In order to send a message between two processes, a programmer must define a message type 562. A site message 564 is a sub-class of the message 562. In class 562 a remote site 14 address has been added. Site message 564 inherits all the behavior and data attributes of message 562 (as indicated by the half moon symbol in the connector line). A packet message 566 has the attributes of connection type, connection ID and data buffer. A buffer message 568 has the data attribute of data buffer. A question message 570 has the data attributes of prompt, number of answers, field length, cursor position, index, type and number. An exam question message 572 has the data attribute of exam number. A student response unit (SRU) 574 message has the data attribute of SRU number. A SRU ID message 576 has the data attribute of student ID. A question response message 578 includes the attributes of question answer, question type and question number. An exam response message 580 includes the attributes of exam number. A student message 582 has the data attributes of last name and first name.

FIG. 10 illustrates a remote site communications management 590. The message communication is done with a sliding window packet protocol that guarantees an ordering of messages and reliable messaging by way of CRC checking. Buffer manager 502 manages a number of virtual circuits, which are packet message connections between site controller 50 and the buffer manager 502. A plurality of system tasks 592 are interfaced by the network manager 500 to the remote sites 14. For example, if a system task 592 wants to send any of the remote sites 14, a sub-class of the site message 564 (which contains the address field) is sent to the network manager 500. A routing table is included in network manager 500 which connects the remote site 14 with the particular buffer manager 502 that is handling communications for the remote site 14. The network manager 500 packages its messages up into a buffer that is forwarded to the buffer manager 502 that places it in the data part of a packet that is sent to the corresponding remote site 14, based on the site address, by X.25 send manager 522. The X.25 receive manager 520 manages incoming X.25 virtual circuits. (Remote sites 14 come in via an X.25 PAD connection.) The received packet and a connection status are sent to the buffer manager 502, signaling a new connection. The buffer manager maintains a table of all the new connections that come in from remote sites 14. Receive manager 520 sends a connection status message to buffer manager 502 that there is a new connection. The remote site controller 50 then sends a call request packet asking buffer manager 502 to create a buffer manager virtual circuit. If buffer manager 502 accepts the request, a call accept packet is sent back via send manager 522. A manager at the remote site 14 accepts that and a buffer manager virtual circuit is established so that messages can pass freely both ways. The remote site controller 50 then starts sending messages, among the first of which is a request to register the remote site 14. The network manager 500 sends a register request to the registrar 516. After checking that the name manager does not have the name but the registration database 518 shows the name, the registrar 516 sends an add name message to the name manager 510. All the clients that have signed up for the various remote site 14 messages will receive copies of them as they come in to host site 12.

A message is returned to the site controller 50 that the name has registered. The site controller 50 then sends a message to initialize the site. An initialize-site message is then sent by the host through the network manager 500. For example, login messages and keypad terminal 52 set up messages are included. When initialization is complete, the host sends an end-site-initialization message to the remote site 14. A site count in icon 148 (FIG. 3) is incremented by one. Site controller 50 initializes keypad terminals 52, giving them a prompt to display. A student then typically types in an ID code that is then packaged up and sent back in a message to the network manager 500. The registrar 516 then performs various checks on the student ID. If the registration is accepted, a student count in icon 144 (FIG. 3) is incremented by one.

FIG. 11 illustrates a call queue management 600 that queues up calls as they are received from the remote sites 14. A viewer or student at a response keypad terminal 52 can press a call button when an audio channel to speak to the presenter (instructor) is desired, e.g., to ask for a clarification of a point of a lecture or to ask a question. A call button press message is received over X.25 channel 20 (FIG. 1) by network manager 500 and forwarded to the client name manager 510, which adds the message to a call request queue. When the call request is granted, the phone manager 512 is checked to see if the site is already connected, and if not, a connect site message is sent. Phone manager 512 sends a set hook state message to phone controller 514 that causes a connection to be made over communications channel 22 (FIG. 1). When a phone connection is made, a line status update message informs the phone manager 512 which, in turn, sends a site connected message to name manager 510. A set microphone state message then issues to network manager 500 which commands terminal 52 to connect its microphone to daisy chain 53 and site controller 50. The student is then live on system 10.

For further illustration, the following describes the call request handling described above in the context of queue management. A student object has two qualities that are used to determine the behavior of the question (call) queue. The first is the student's rank, which may be (in order of priority): expert, normal, locked-out. A lockedout student object will never advance through the queue. The student's rank is used by the priority queue structure (described hereinafter) to determine the student object's placement in the queue.

The second quality is the student object's state. This may be any one of inactive, waiting, selected or speaking. Most of these states correspond directly to the microphone states of the student's keypad, with the exception of selected. This state is a transitional state that occurs when the instructor selects a student directly for speaking, but before the phone line connection 22 is made. For most purposes a selected student object is treated the same as a speaking student object.

A queue is a simple structure from which objects may be removed from the head in the same order they were added to the tail. In addition, a facility for removing an object from the tail or placing it at the head is provided for special occurrences. A priority queue is a collection of queues which may be handled as one queue with one head and one tail. When an object is added to a priority queue, it is added to the tail of the queue appropriate to the priority of the object. When an object is taken from the head of a priority queue, the internal queues are checked for members from the highest priority to the lowest. The priority is determined by the student's rank (e.g., an expert student has a higher priority than a non-expert, normal student). Therefore, when a student object is asked for from a priority queue, the expert queue is checked first, then the normal queue (if there were no student objects present in the expert queue). Student objects are visible to the instructor in user interface 92 (FIG. 3) in two monitors.

A holding area is a set of temporary queues where student objects are placed as their remote site 14 attempts to make the voice line connection with host 36. The connected queue and the unconnected queue are priority queues. Although referred to herein as queues, it is important to know that they are actually priority queues, based upon the student's rank, even when this is not explicitly stated.

Message Actions

When a student presses the call button, the student object is entered at the tail of the unconnected queue. This triggers an automatic advancement process that continues until no more movement is registered.

A line status message is sent to the phone manager 512 when the phone controller 514 detects a ring signal on a phone line that has been allocated to a particular remote site 14. The phone manager 512 sends the connected message for remote site 14 back, causing the students requests in the site's temporary queue (in the holding area) to be emptied and transferred to the tail of the connected queue. This also triggers the automatic advancement process.

When a connection failure message is received, the phone manager sends the remote site 14 disconnected message to the name manager 510 under two conditions. First, the remote site 14 has exceeded the time allotted for connection without a ring signal being detected on the selected phone line. Or second, a ring signal has been detected on the phone line that subsequently stops ringing.

When name manager 510 receives a connection failure message, any speaking or selected student object from that remote site 14 showing in one of the monitor boxes in user interface 92 is removed. Any waiting student object from that remote site 14 in one of the monitor boxes is added to the head of the unconnected queue. Any students' requests from that remote site 14 that are in the connected queue, or the holding area, are added back to the head of the unconnected queue. The automatic advancement process is then triggered.

When an activate student object is received, the instructor can decide whether or not to enable the microphone of a student that has a student object currently waiting in a monitor box 130 or 132 (which the name manager had received as a message from user interface 92). When such a message is received, the name manager 510 tells the phone manager 512 to pick up (or un-mute) the appropriate phone line 22 and sends a message to the remote site 14 to enable the student's microphone. The automatic advancement process is then triggered.

When a disconnect student message is received because the instructor decided to disconnect the microphone of a student currently speaking (or at least selected), as shown in one of the monitor boxes, the name manager 510 is sent a disconnect student message from user interface 92. When such a message is received, the name manager 510 clears out the monitor box and sends a message to the remote site 14 to deactivate the student's microphone. Then the other monitor box and the connected queue are checked for any more students from the same remote site 14. If there is a student object from the same remote site 14 speaking in the other box, the phone manager 512 is not commanded to take any action. If there are student objects waiting from the same remote site 14 already in a box or the connected queue, the phone manager 512 is commanded to place on hold (mute) the site's phone line. If there are no student objects from the remote site 14 found in the other monitor or the connected queue, the phone manager is told to hang up the phone line. After any one of these decisions, the automatic advancement process is then triggered.

A force-on message is received when the instructor wants to call on a particular student object in user interface 92, e.g. by using random call button 204. A force-on message is sent to the name manager 510. This command is available to the instructor only when there is at least one monitor box without a speaking or selected student object. A selected student object is one which has been forced-on, but whose remote site 14 has not yet made the voice line connection.

When the message is received, a number of things must also happen to accept the message. If the monitor box from which the student object that was selected has already been occupied by a waiting student object, the selected student object is pushed back onto the head of the connected queue. Then the connected sites are checked. If no phone lines are available, and none of the phone lines are connected to the remote site 14 belonging to the selected student object, one of the phone lines must be freed-up. A phone line is freed-up by pulling student objects off the tail of the connected queue and by pushing those student objects onto the head of the unconnected queue until a move results in disconnecting the respective remote site 14. For example, if the instructor selects student object S4, and the connected queue contains student objects S1, S2, S3, and S2'; then S2' must be pulled off first. This does not disconnect remote site two, because one other student object from that remote site is still in the queue. Student object S3 is then moved, and is the last student object from remote site 14 in the connected queue, so the remote site 14 is told to disconnect. This results in a free line that can now be used to have remote site four call in on.

There are two distinct phases to the automatic advancement process, unconnected queue to holding and connected queue to monitor boxes. The movement from the holding area to the connected queue occurs only as the direct result of a remote site 14 connected message received from the phone manager. In phase one (unconnected queue to holding), the student object at the head of the unconnected queue is examined. If the respective remote site 14 is already connected, the student object is moved to the tail of the connected queue and we start again at the beginning of the process. If the respective remote site 14 is already in the connection holding area, the student object is transferred to the end of the queue for the respective remote site 14 in the holding area and starts again at the beginning of the process. If the respective remote site 14 is not connected and is not in the holding area, a check is made to see if there is a phone line available. If a line is available, the remote site 14 is commanded to dial into that line, to create a new (albeit temporary) queue in the holding area and to move the student object into the newly created queue. If no phone lines are immediately available, and the student is an expert, a check is made of the holding area for sites that are currently connecting that do not have an expert in their holding queue. If such a remote site 14 exists, a disconnect is issued to free up the line for the expert that is trying to get through. If there are no qualifying sites in the holding area, student objects are backed-off the tail of the connected queue onto the head of the unconnected queue until one of two conditions is satisfied. First, all student objects from a remote site 14 are transferred, thereby freeing a phone line for use by the waiting expert. Second, the only students left are experts themselves. The unconnected expert has no priority over previously connected experts. If no phone lines are available, no further phase one movement is possible.

In phase two (connected queue to monitor boxes 130 and 132), the student object at the head of the connected queue is examined. If the student is an expert, the request is placed in an empty monitor box 130 or 132. If no empty monitor box is available, one is emptied by removing a waiting student object with a normal rank. An expert may not displace another waiting expert, nor may an expert displace any speaking or selected student object of any rank. If the student is not an expert, the request is placed in an empty monitor box (130 or 132) under one of four conditions: a) the other monitor box is empty, b) the other monitor box contains a speaking student, c) the other monitor box contains a selected student object, or d) the other monitor box contains an expert.

FIG. 12 illustrates a pop question/quiz management 610. Card stack UI task 528 and card manager 506 pass the following messages between them: load stack, next/previous card and execute media. Between card manager 506 and exam manager 504 are messages for: start/end session, issue quiz, issue question, exam question and exam start. Exam manager 504 and pop question/quiz UI task 526 exchange messages for issue pop question and stop event. Exam manager 504 and a pop question/quiz display task 612 exchange messages for exam/question issued, question results and exam/question end. (The display task 612 may use a TARGA board, which is a type of NTSC video output board that drives output 68 and is a product of True Vision.) The exam manager 504 and network manager 500 exchange messages for: exam download, exam question, exam start, exam end, pop/formatted question and pop/formatted question end. Messages for exam question response, student complete exam and pop/formatted question response are sent from exam manager 504 to an exam/question results file 614. A card stack 616 is loaded into the card manager 506 from a disk file. A select display message is sent by pop question/quiz UI task 526 to pop question/quiz display task 612.

To further the understanding, the following describes the pop question and quiz management from another perspective. Pop questions are initiated by the host site 12 utilizing a pop question download message. This message is translated to a pop question message by site controller 50 then forwarded to the keypads whereat they are displayed. When a student completes the question, a pop question response is queued by terminal 52, which will answer with a pop question response when polled for current student input. This response is forwarded to the host site 12 using a pop question response message. If a terminal 52 logs in after a pop question has been issued, the question will not be forwarded to terminal 52. Pop questions can be stopped by the host site 12 by sending a pop question end message and on receipt of this message site controller 50 forwards a set mode message with a mode of normal (00) to each logged in keypad which clears the question and again displays the students name.

Formatted questions are handled similarly to a pop question, differing mainly in the area of question storage. A formatted question is downloaded to a keypad if it logs in after a formatted question has been issued thus requiring local storage of the question. Formatted questions are initiated by the host site 12 utilizing a formatted question download message and question responses are returned with a formatted question response message. The site controller 50 uses pop question messages for site controller 50 to keypad communications as the pop and formatted questions appear the same to a keypad. Formatted questions can be stopped by the host site 12 with a formatted question end message, on receipt of this message site controller 50 clears the current formatted question and again displays the students name. Keypads which login after this point do not get the formatted question.

Quiz download to a site controller 50 requires a three stage process: initialization, question download and exam startup. The host site 12 first transmits an exam download message to site controller 50, which contains the number of questions in the exam and the exam number. On receipt of an exam download message site controller 50 initializes local exam storage and stores the exam number and number of questions. This message is followed by a series of exam question download messages, each message containing all required data for a single exam question. The site controller 50 stores each question locally and also transmits the question to each keypad with a exam question message. Both exam download and exam question message are broadcast to all terminals 52 simultaneously, using a broadcast address of zero in the address field. At the completion of a question broadcast to terminals 52, site controller 50 then queries each response keypad terminal 52 with a query exam message to determine which exam questions the response keypad terminal 52 received and retransmits questions not received. On receipt of a query exam message, the response keypad terminal 52 will respond with the lowest numbered question not received, if all questions were received the response keypad terminal 52 responds with an acknowledge.

The host site 12 then sends an exam start message to site controller 50 to begin the exam. At this time site controller 50 broadcasts a set mode with a mode of quiz to each response keypad terminal 52 which is logged in causing the response keypad terminal 52 to display the first exam question on the response keypad terminal 52 display included in terminal 52. Students responses are detected by site controller 50 via question response messages from the response keypad terminals 52 in response to poll messages from site controller 50. As question responses are received from the response keypad terminal 52 they are forwarded to the host site 12 with exam question response messages, one for each response. On completion of an exam the response keypad terminal 52 responds with a question response message with an answer type of exam complete at which point site controller 50 forwards a student exam complete message to the host site 12.

An exam can be manually terminated by the host site 12 with an exam end message. The site controller 50 will transmit set mode messages with a mode of normal to each logged in response keypad terminal 52, which clears the exam displayed on the response keypad terminal 52 display included in terminal 52 and again displays the students name.

Similar to formatted questions, exams are downloaded and started on keypads which login after the exam has commenced. A call button press message is entered into the response keypad terminal 52 poll queue when a student presses a response keypad terminal 52 call button after a student has been logged in. The press is detected by site controller 50 during its regular response keypad terminal 52 polling sequence. On receipt of a call button press, site controller 50 will check its current state for the call button, toggle it and forward the new call button state to the host site 12 with a call button state message. The site controller 50 local call button state is cleared (e.g., set to off) when a response keypad terminal 52 is logged off.

Flag button presses are handled in a similar manner, except button state is not monitored. The site controller 50 forwards a flag button press message to the host site 12 when a press is detected during response keypad terminal 52 polling.

Student login is comprised of several steps including ID entry and retrieval from response keypad terminal 52, ID validation on host site 12 and student name download to the response keypad terminal 52. During site login response keypad terminal 52, login prompt messages and the ID input field width are downloaded from the host site 12 with a login setup message. Login prompt messages consist of one prompt for normal login entry and two for login error condition. After site login the normal login prompt (prompt one) is displayed on the first row of display included in terminal 52, using the display message along with an input field for student ID entry on the second row using the terminal input message. On detection of a terminal input response from a polled response keypad terminal 52, site controller 50 forwards a validate student ID message to the host site 12 containing the entered ID string and the originating response keypad terminal 52 address. The host site 12 then attempts to locate the ID in the student database and if found responds with a student ID validation message with a status code of 0 together with the retrieved students name and ID. The site controller 50 then parses the student name from the validation message, builds a define message from the student name text with a message slot number of zero and downloads and displays this message on the response keypad terminal 52 at which the ID was entered. The passed ID field is stored locally on site controller 50. A wild card ID of zero is supported for which the host site 12 returns with an automatically generated student name and ID (not zero). If the entered ID is not found in the student database or a student with a matching ID is already registered at the host site 12 a validate student ID message will be returned with status codes on one and two respectively. At this point, site controller 50 will reprompt for the ID with login prompt two for status code one and login prompt three for a status code of two.

Student logoff can be initiated from either the host site 12 or site controller 50 itself. Logoff initiation from the host site 12 is accomplished through transmission of a student logoff message to site controller 50 with the response keypad terminal 52 number included. The site controller 50 will logoff that response keypad terminal 52 if it is currently logged in and reinitialize the response keypad terminal 52 to allow another student to login. A site controller 50 initiates a student logoff by sending a student logoff request to the host site 12 system, and if the student is logged in at the host site 12, the host site 12 will respond with a student logoff to site controller 50.

FIG. 13 illustrates an author card stack object process 620. A card stack process 640 includes attributes for header and card collection. A card process 642 includes attributes for media event, notes and title. A media process 644 has autotrigger and media event attributes. A quiz process 646 includes data attributes collection of questions, text, autoprint and quiz number. A question process 648 carries attributes for answer text (array), question text, question type, answer and number.

The site controller 50 message processes are illustrated in FIGS. 14 through 16. In FIG. 14, the processes that have similar functions as those with the same names in viewer response system 80 are nevertheless given their own identifying element numbers. A site controller communication process 720 comprises a connection manager 702, a phone manager 704, a menu manager 706, a keyboard manager 708, a buffer manager 710, a modem manager 712, a script manager 714, a classroom manager 716, an electrically erasable programmable read only memory (EEPROM) manager 718, a printer manager 720 and a file manager 722. Keypress messages are sent from keyboard manager 708, which cares for terminals 52, to menu manager 706 as they occur. Command and status messages are exchanged between menu manager 706 and connection manager 702. Dialing command messages are sent from connection manager 702 to phone manager 704. Print command messages are sent from connection manager 702 to printer manager 720. Data and commands are exchanged between connection manager 702 and EEPROM manager 718. File data and commands are exchanged between connection manager 702 and file manager 722. File data and commands are sent to printer manager 720 from file manager 722. Data messages are exchanged between connection manager 702 and classroom manager 716. Connection manager exchanges connection and data messages with buffer manager 710 which communicates data packet messages with modem manager 712. Modem commands are exchanged between modem manager 712 and script manager 714 which communicates connection and status messages with connection manager 702. Process 700 coordinates the three possible communications channels (18, 20 and 22) that can exist between a site controller 50 and host site 12.

Thus in operation, when a student at a terminal 52 presses a key on a keypad, a keypress message is sent from keyboard manager 708 to menu manager 706. A message is sent to connection manager 702 that requests the keypress message be sent to host site 12. The keypress message is bundled up in a data message that is forwarded to buffer manager 710. A data packet is filled by the data message and sent by buffer manager 710 to modem manager 712. If an X.25 PAD connection has not yet been established, a connection table maintained in connection manager 702 will reflect that fact and send a connection message to script manager 714. A modem connection script is formulated from one of several script files into modem commands that are sent by the script manager 714 to the modem manager 712 that establish an X.25 virtual circuit. EEPROM manager 718 handles the reading and programming details needed to interface to an EEPROM that stores non-volatile data for site controller 50. File manager 722 sends a print file message to printer manager 720 when the host site 12 wants to print the text of an exam that has previously been downloaded to remote site 14. The print command itself comes directly from the connection manager 702, which is sourced originally from host site 12 over the X.25 connection on communications channel 20.

FIG. 15 illustrates a menu manager interface that supports menu manager 706. A predefined set of menu files are maintained for use within menu manager 706. User requests that are prompted for via a menu on a display included in site controller 50 are routed by menu manager 706 to the appropriate tasks. For example, dialing test messages are sent to phone managar 704. Display data messages (the menus) are sent to a liquid crystal display (LCD) manager 724. Audio messages, such as those needed to control threshold and delay, are steered to an audio manager 726. Keypress messages that come in response to menus being displayed come in from keyboard manager 708. Command messages are exchanged with connection manager 702 and allow some control by a user of site controller 50 over the communications connections. Data and command messages, such as exam data, are communicated between menu manager 706 and classroom manager 716.

FIG. 16 illustrates the message connections for the interactions of classroom manager 716. A student response unit (SRU) manager 728 provides data messages and acknowledgments between response keypad terminal 52 and classroom manager 716. A network administration manager 730 that sends status and data messages to classroom manager 716. Poll and reply messages are exchanged with SRU manager 728. The several response keypad terminals 52 that can be connected to site controller 50 are constantly polled by SRU manager 728 and and changes of on/off status are communicated back to host site 12 through network administration manager 730. Which terminals 52 need to be registered or initialized are kept track of in this way. User choices elicited by menu manager 706 result in command messages to the classroom manager 716 that can result, for example, in data communication connections being made or broken.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A interactive network for remote educational instruction, system comprising:
    a host site including:
        a studio for transmitting a plurality of live video images and sounds that are directed by a presenter via a satellite radio link to at least one remote audience location,
        a computer for displaying an interactive network status to said presenter that includes a total number, identity and prioritization of callers from said remote audience locations,
        a phone controller for accepting phone calls from at least one individual at said remote audience location for permitting telephone conversations; and
    at least one remote site at said remote audience location that includes:
        a video monitor for receiving said video images and sounds via said satellite radio link, and
        a remote site controller with a plurality of response keypad terminals for digitally communicating a series of keypad entry responses of said at least one individual to said video images and sounds and including a microphone for telephonic communication with said presenter.

2. A method of remote educational instruction over a network, comprising the steps of:
    broadcasting a live video image and voice of an instructor at a host site to at least one remote site via a satellite radio link; signaling said instructor that at least one student at one remote site has requested to speak to said instructor by pressing a call button on a response keypad terminal located near said student which is in digital communication with said host site via a dial-in telephone link;
    identifying to said instructor said signaling student by displaying a line of text on a monitor screen located at said host site;
    indicating to said instructor a total number of students signaling for attention by displaying a line of text on said monitor screen;
    enabling said instructor to select one of said students that are signaling by displaying a list of available communication connection commands on said monitor screen and by accepting a command choice input; and
    establishing a telephone connection from said host site to said remote site to telephonically link a selected signaling student to said instructor through said response keypad terminal which includes a microphone for telephonic communication with said instructor and to allow digital communication of a series of keypad entry response.

3. The method of claim 2, wherein:
    the establishing of said telephone connection further includes broadcasting the voice of said selected signaling student over the network from said host site via said satellite radio link wherein other students can receive both sides of a telephonic conversation between said instructor and said selected signaling student.

4. The method of claim 2, wherein:
    the broadcasting includes a satellite communications channel for uplinking a signal representing said video image and voice of said instructor to a satellite at said host site and for downlinking said signal from said satellite to said remote sites in parallel.

5. The method of claim 4, further comprising the steps of:
    half-duplexing said voice of said instructor and selected signaling student such that the two are alternated in time, wherein a satellite delay echo is thereby eliminated from being broadcast by said host site.

6. The method of claim 5, further comprising the steps of:
    adjusting a threshold level and a delay time for said half-duplexing of said voice of said instructor and selected signaling student wherein various satellite delay time and background noise levels at remote sites are compensated for.

7. The method of claim 6, wherein:
    the adjusting of said threshold level and a delay time comprises accepting command input from a touch screen monitor connected to a computer at said host site that represents a choice of said instructor as to available threshold levels and then by signaling a telephone controller to make an appropriate telephonic connection.

8. The method of claim 2, wherein:

the enabling of said instructor to select a signaling student comprises using a touch screen monitor driven by a computer that displays an icon representing said signaling student and that accepts as an input command a selection sensed by a touch input panel coupled to said computer.

9. The method of claim 2, wherein:

the indicating to said instructor that a student is currently signaling for attention comprises displaying an icon representing an identifying code for said signaling student on a touch screen monitor driven by a computer at said host site.

10. The method of claim 2, wherein:

the establishing of said telephone connection comprises accepting command input from a touch screen monitor connected to a computer at said host site that represents a choice of said instructor as to which signaling student is to be telephonically connected and then by signaling a telephone controller to make an appropriate telephonic connection.

11. An interactive network for live presentations to audiences, comprising:

broadcasting means for televising an instructor at a host site to at least one remote site;

remote sensing means for signaling said instructor that at least one student at one remote site has initiated a call button on a response keypad terminal located near said student to request a telephonic connection and conversation;

computer display means for presenting a video image on a screen to said instructor that represents said signaling student and for indicating to said instructor a total number of students then signaling by a number presented on said screen;

control means for enabling said instructor to select one of said students that are signaling by displaying a list of available communication connection commands on said monitor screen and for accepting a command choice input; and communication manager means for establishing a telephone connection from said host site to said remote site wherein said selected signaling student may be telephonically connected to said instructor in response to a command input at a touch screen display which represents said instructor's choice of said signaling student.

12. The network of claim 11, wherein:

the broadcasting means includes a satellite communication channel for uplinking a signal representing said video image and voice of said instructor at said host site to a satellite and for downlinking said signal from said satellite to said remote sites in parallel.

13. The network of claim 4, wherein:

the remote sensing means comprises a computer system having a site controller at said remote site and a host computer and phone controller at said host site interconnected by an X.25 PAD communications channel that establishes a message virtual circuit for object oriented tasks.

14. The network of claim 11, wherein:

the computer display means comprises a monitor with touch screen means for allowing a user to choose amongst commands by touching various icons temporarily displayed on said monitor under the direction of a computer.

15. The network of claim 11, further comprising:

means for half-duplexing a telephonic conversation between said instructor and said selected signaling student and for preventing a satellite delay echo from being broadcast by said host site.

16. The network of claim 15, further comprising:

means for adjusting a threshold voice level and a turnaround delay time for said half-duplexing of the voice of said instructor and selected signaling student for compensating for a variety of satellite delay times and background noise levels at said remote sites.

* * * * *